US006712531B2

United States Patent
Takagi et al.

(10) Patent No.: US 6,712,531 B2
(45) Date of Patent: Mar. 30, 2004

(54) CAMERA

(75) Inventors: Junichi Takagi, Asaka (JP); Ko Aosaki, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/073,167

(22) Filed: Feb. 13, 2002

(65) Prior Publication Data

US 2002/0110375 A1 Aug. 15, 2002

(30) Foreign Application Priority Data

Feb. 13, 2001 (JP) ........................................ 2001-035687
Nov. 28, 2001 (JP) ........................................ 2001-362630

(51) Int. Cl.[7] ................................................ G03B 5/02
(52) U.S. Cl. ....................................................... 396/349
(58) Field of Search ................................. 396/348, 349

(56) References Cited

U.S. PATENT DOCUMENTS

| | | | | |
|---|---|---|---|---|
| 4,219,265 A | * | 8/1980 | Waaske ........................ 396/349 |
| 4,419,002 A | * | 12/1983 | Fujita ........................... 396/349 |
| 4,752,796 A | * | 6/1988 | Tsukahara et al. ........... 396/349 |
| 4,961,084 A | * | 10/1990 | Komatsuzaki et al. ........ 396/90 |
| 5,270,754 A | * | 12/1993 | Newman ....................... 396/178 |
| 5,664,240 A | * | 9/1997 | Arita et al. ................... 396/349 |
| 6,208,809 B1 | * | 3/2001 | Kanai et al. .................. 396/349 |

FOREIGN PATENT DOCUMENTS

JP 60-114836 * 6/1985 ........... G03B/17/12

* cited by examiner

Primary Examiner—Christopher Mahoney
(74) Attorney, Agent, or Firm—Young & Thompson

(57) ABSTRACT

The invention relates to a camera provided with a main body portion, and a lens camera cone freely sunk and reeled out in accordance with a manual operation, and improve an operability of manually reeling out the lens camera cone and manually sinking the lens camera cone. The camera is provided with a positioning means for positioning the lens camera cone at a predetermined reel-out position at a time when the lens camera cone is reeled out and positioning the lens camera cone at a predetermined sinking position at a time when the lens camera cone is sunk, and an energizing means for energizing the lens camera cone toward the reel-out position at a time when the lens camera cone exists in a portion near the reel-out position, and energizing the lens camera cone toward the sinking position at a time when the lens camera cone exists in a portion near the sinking position.

20 Claims, 15 Drawing Sheets

CAMERA

BACKGROUND OF THE INVENTION

1. Field of the Invention

The present invention relates to a camera provided with a main body portion and a lens camera cone freely sunk and reeled out by a manual operation.

2. Description of the Related Art

Conventionally, in order to make the camera thin, there has been popular a technique of sinking a lens camera cone, and this technique is employed in a so-called instant camera which photographs on a film sheet corresponding to a self-development processing type photosensitive material and discharges the film sheet while expanding a developing solution on the film sheet.

However, a photograph screen on the film sheet used in the instant camera mentioned above is generally larger than a photograph screen of a photographic film used in a normal camera photographing on a long photographic film one scene by one scene, whereby it is necessary to increase a focal distance, so that the lens camera cone of the instant camera tends to be larger than that of the normal camera.

Accordingly, if it is desired to sink or reel out the lens camera cone in accordance with an electric power, a motor generating a great driving force and a complex driving mechanism are required, whereby a cost increase is generated.

Accordingly, in order to restrict the cost increase, there can be considered that the lens camera cone is manually sunk or reeled out.

In Japanese Patent Publication No. 61-31852, there is described a camera sinking and reeling out a lens camera cone in accordance with a manual operation, and an energizing means for energizing the lens camera cone existing at a reel-out position toward a sinking position is provided in the camera for the purpose of assisting the sinking operation. Further, in Japanese Utility Model Publication No. 56-50503, there is described a camera sinking or reeling out a lens camera cone in accordance with a manual operation, and in the camera described in this publication, in addition to an energizing means for energizing the lens camera cone existing at a reel-out position toward a sinking position, an energizing means for energizing the lens camera cone existing at the sinking position toward the reel-out position is provided for the purpose of assisting the reel-out operation.

However, explaining the camera described in Japanese Utility Model Publication No. 56-50503 as an example, in the camera described in this publication, there is a problem that an energizing force is applied in a direction opposite to an operating direction at a time of reeling out the lens camera cone to a portion near a predetermined reel-out position or sinking to a portion near a predetermined sinking position, whereby an operability is deteriorated.

Even if the energizing means described in the publication mentioned above is applied to various types of cameras which sink or reel out the lens camera cone in accordance with a manual operation, in addition to the instant camera, the same problem as that mentioned above is generated.

SUMMARY OF THE INVENTION

The present invention is made by taking the above matters into consideration, and an object of the present invention is to provide a camera in which an operability of manually reeling out and manually sinking a lens camera cone.

In order to achieve the object mentioned above, in accordance with the present invention, there is provided a camera having a main body portion, and a lens camera cone freely sunk and reeled out in accordance with a manual operation, comprising:

a positioning means for positioning the lens camera cone at a predetermined reel-out position at a time when the lens camera cone is reeled out and positioning the lens camera cone at a predetermined sinking position at a time when the lens camera cone is sunk; and an energizing means for energizing the lens camera cone toward the reel-out position at a time when the lens camera cone exists in a portion near the reel-out position, and energizing the lens camera cone toward the sinking position at a time when the lens camera cone exists in a portion near the sinking position.

In the camera in accordance with the present invention, on the sake of the energizing means, since the energizing force in the operating direction is applied at a time of reeling out the lens camera cone to the portion near the predetermined reel-out position or sinking the lens camera cone to the portion near the predetermined sinking position, an operability is improved. Further, since the positioning means is provided, it is possible to reel out the lens camera cone to the reel-out position or sink the lens camera cone to the sinking position, whoever manually operates.

Further, in the camera in accordance with the present invention, it is preferable that the energizing means energizes the lens camera cone at each of a plurality of angular positions obtained at a time of separating all the periphery of the lens camera cone into a plurality of sections having a uniform angle.

As mentioned above, since the energizing means energizes the lens camera cone at the angular positions, it is possible to prevent the lens camera cone from being inclined or caught on in the sinking operation or the reel-out operation in accordance with the manual operation, so that an operability is improved.

Further, in the camera in accordance with the present invention, the energizing means may be a toggle spring arranged at each angular position.

Further, in the camera in accordance with the present invention, it is preferable that a bellows for shielding light, connecting the main body portion with the lens camera cone is provided, and the bellows carries out a part of the energizing means so as to establish an operation of energizing the lens camera cone toward the reel-out position at a time when the lens camera cone exists in the portion near the reel-out position.

Since the bellows mentioned above is provided, it is easy to execute the manual reel-out operation so as to improve the operability, and it is possible to obtain a nice photograph.

Further, in the camera in accordance with the present invention, it is preferable that the lens camera cone is provided with a finger-engage portion with which a finger of an operator is engaged at a time of manually reeling out the lens camera cone, in a front end portion thereof.

The finger-engage portion referred here is provided for the purpose that a user can easily reel out the lens camera cone in the reel-out operation of the lens camera cone manually applied from the sinking position, for example, may protrude out in a radial direction of the lens camera cone all around the periphery of the lens camera cone, or may partly protrude, or maybe recessed all around the periphery in a reversed manner, or may be formed as a recess aligned with a finger part of a palm, or may be formed Ad by increasing a frictional resistance. By providing with the finger-engage portion mentioned above, the manual reel-out operation becomes easily executed and the operability is improved.

Further, in the camera in accordance with the present invention, it is preferable that the structure further comprises:

a lens barrier arranged on a front surface of the lens camera cone, opening in correspondence to a reel-out operation of the lens camera cone and closing in correspondence to a sinking operation of the lens camera cone;

a shutter mechanically connected to the main body portion at a time when the lens camera cone is at the reel-out position, connected to the main body portion via a connecting mechanism in which the connection to the main body portion is removed at a time when the lens camera cone is at the sinking position, executing an opening and closing operation on the basis of a drive force transmitted via the connecting mechanism in correspondence to a release operation at a time when the lens camera cone is at the reel-out position, and getting freedom from the transmission of the drive force applied via the connecting mechanism at a time when the lens camera cone is at the sinking position, the shutter being provided in an inner portion of the lens camera cone; and a main power supply switch keeping an on state at a time when the lens camera cone is at the reel-out position and keeping an off state at a time when the lens camera cone is at the sinking position.

In accordance with the aspect mentioned above, by executing some operations of the camera in the course from starting using the camera to finishing the camera with using the sinking operation and the reel-out operation of the lens camera cone in accordance with the manual operation, it is possible to restrict a cost increase of the camera.

DESCRIPTION OF THE PREFERRED EMBODIMENT

A description will be given below of an embodiment in accordance with the present invention.

Figure 1:
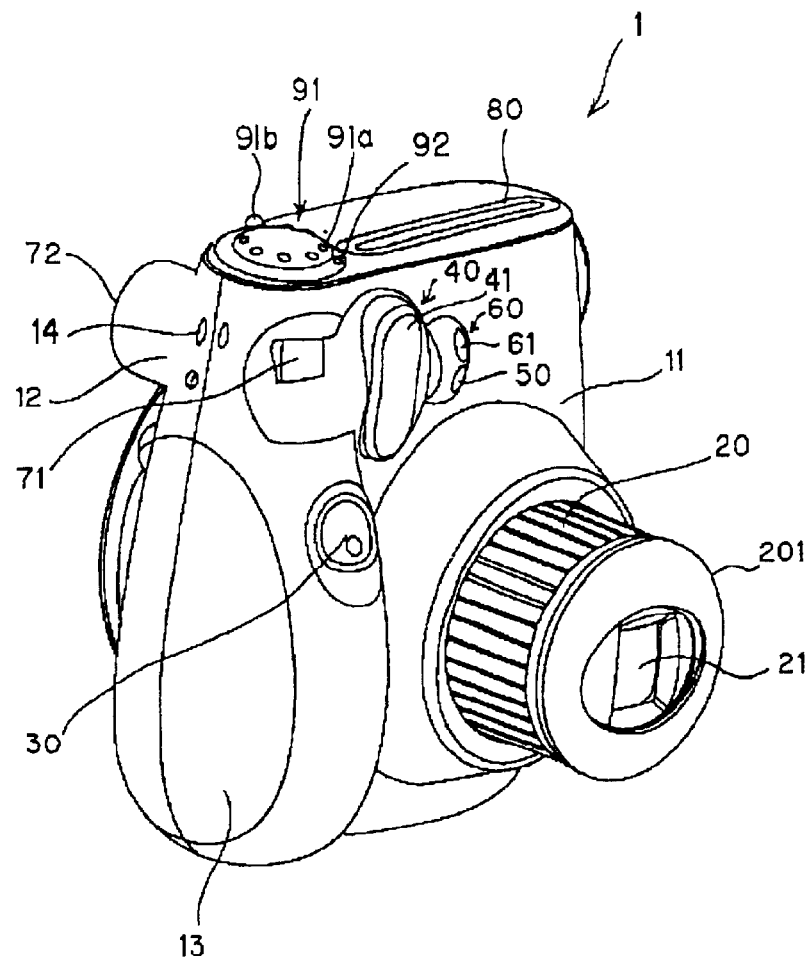
FIG. 1 is a perspective view of an appearance obtained by seeing a camera in accordance with one embodiment of the present invention from an obliquely upward portion of a front surface.

FIG. 1 is a perspective view of an appearance obtained by seeing a camera in accordance with one embodiment of the present invention from an obliquely upward portion of a front surface.

A camera shown in FIG. 1 is a comparatively compact instant camera structured such that a film pack in which film units for an instant photograph are laminated is attached, and photographing is applied on the film units within the film pack.

The film unit used here is a mono-sheet type self-developing process photosensitive material which is exposed to a photographing light applied onto a photosensitive surface and is thereafter developed and discharged toward an external portion of the camera in accordance with a drive operation of a film drive mechanism, and during the developing and discharging operation, a developing pod within the film unit is crushed, whereby a developing solution is evenly developed between a photosensitive layer and a transferring layer, and a developing process and a transferring process are executed, so that a positive image quickly appears.

The camera 1 shown in FIG. 1 has a front cover 11, a rear cover 12 and a battery chamber cover 13 forming an appearance of the camera 1 together with the front cover 11 and the rear cover 12, and a camera main body is provided in an inner portion surrounded by the front cover 11, the rear cover 12 and the battery chamber cover 13.

A cylindrical lens camera cone 20 supporting a photographing lens 21 in an inner portion thereof and changed a position thereof with respect to the camera main body between a time before using the camera and a time of using the camera is provided in a center portion of a front surface in the camera 1. In this case, a shape of the lens camera cone is not limited to the cylindrical shape, but may be a rectangular tubular shape. In FIG. 1, there is shown a state that the lens camera cone 20 is reeled out to a predetermined reel-out position. In this camera 1, the lens camera cone 20 is reeled out from a predetermined sinking position provided in the camera main body so as to become in a state shown in FIG. 1, whereby it is possible to photograph. In this camera 1, the reel-out operation and the sinking operation of the lens camera cone 20 are manually executed, so that a drive mechanism required for reeling out or sinking the lens camera cone 20 is not required, and it is possible to achieve a low cost. Further, in order that a user easily reel out from the sinking position in accordance with a manual operation, a finger-engage portion 201 is provided in a front end portion of the lens camera cone 20. The finger-engage portion 201 in the camera 1 in accordance with the present embodiment is structured such as to protrude in a radial direction of the lens camera cone 20 all around the periphery of the lens camera cone 20, however, the structure is not limited to this, may be partly protrude, or may be recessed in a reverse manner all around the periphery, or may be a recess aligned with a finger part of a palm, or may be formed by increasing a frictional resistance.

A release button 30 is arranged in a right side (a left side in FIG. 1) of a front surface of the camera 1. The camera 1 is structured such that the release button 30 is pressed down, where by a photographing light is exposed on a film unit. Further, a flash 40 having a protector 41 arranged in a front surface thereof is provided obliquely above the release button 30. Further, in a left side (a right side in FIG. 1) of the protector 41, there is provided a flash light receiving window 50 for introducing a flash light to a light receiving device which is not shown, receiving a light amount of the flash light reflected by a photographic subject at a time of emitting the flash light and returned. Further, the camera 1 is provided with a light measuring portion 60 for measuring a brightness of field, and a light receiving window 61 for introducing the light to a built-in light measuring device which is not shown, is provided above the flash light receiving window 50. Further, a reverse Galileo type finder is mounted to the camera 1, a finer objective window 71 is arranged at a position adjacent to the flash 40, and a finder eyepiece window 72 is arranged in a rear portion of the camera 1.

A strap inserting portion 14 to which a strap is inserted is provided in a right side surface of the camera 1.

A film unit discharge port 80 for discharging a film unit which has been already photographed to an external portion of the camera 1 is provided on an upper surface of the camera 1. Further, a lens stop setting dial 91 and four light emitting devices 92 are provided in a right side of the film unit discharge port 80. A description will be given below of the lens stop setting dial 91 and four light emitting devices 92 with reference to FIG. 2 together with FIG. 1.

Figure 2:
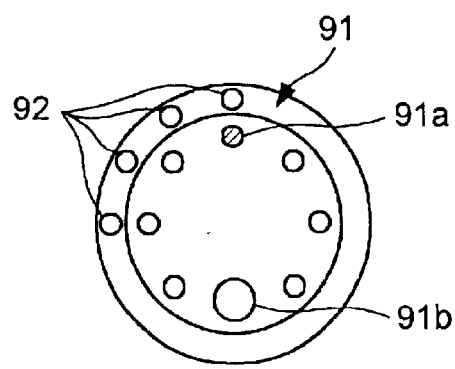
FIG. 2 is a plan view of a lens stop setting dial (an aperture setting dial) and four light emitting devices.

FIG. 2 is a plan view of the lens stop setting dial and four light emitting devices.

The lens stop setting dial 91 is one of operating devices operated by the user at a time of using the camera 1, and an index 91a and a columnar aperture dial rotating convex portion 91b structured such as to be easily operated at a time when the user executes a rotating operation are provided in the lens stop setting dial 91 taking a design view into consideration. The respective four light emitting devices 92 are arranged adjacent to each other along an outer periphery of the lens stop setting dial 91, and independently emit red lights and green lights. In this case, as mentioned below, a lens stop value (an aperture value) of the camera 1 can be freely switched to four stages, and the respective light emitting devices 92 and the respective lens stop values correspond to each other in one—one relation. The lens stop value of the camera 1 is set to a lens stop value corresponding to the light emitting device 92 with which the index 91a is aligned, by a mechanism mentioned below. When the brightness of field is measured by the light measuring portion 63, the light emitting device 92 corresponding to the lens stop value in accordance with the measured brightness of field lights in a red color so as to indicate the setting of the lens stop value given by the user. When the index 91a is aligned with the light emitting device lighting in the red color in accordance with the rotating operation of the lens stop setting dial 91, the light emitting device 92 lighting in the red color is switched to the lighting in a green color so as to indicate to the user that the lens stop value of the camera 1 is set to the lens stop value corresponding to the brightness of field. In accordance with the present embodiment, since four light emitting devices 92 mentioned above are provided, it is possible to guide the operation of the lens stop setting dial 91 given by the user, whereby it is possible to make the user easily set the lens stop value. These four light emitting devices 92 correspond to the indicating portion in accordance with the present invention.

Next, a description will be sequentially given of a characteristic internal structure in the camera 1 shown in FIG. 1.

At first, a description will be given of a summary of the internal structure in the camera 1 with reference to FIG. 3.

Figure 3:
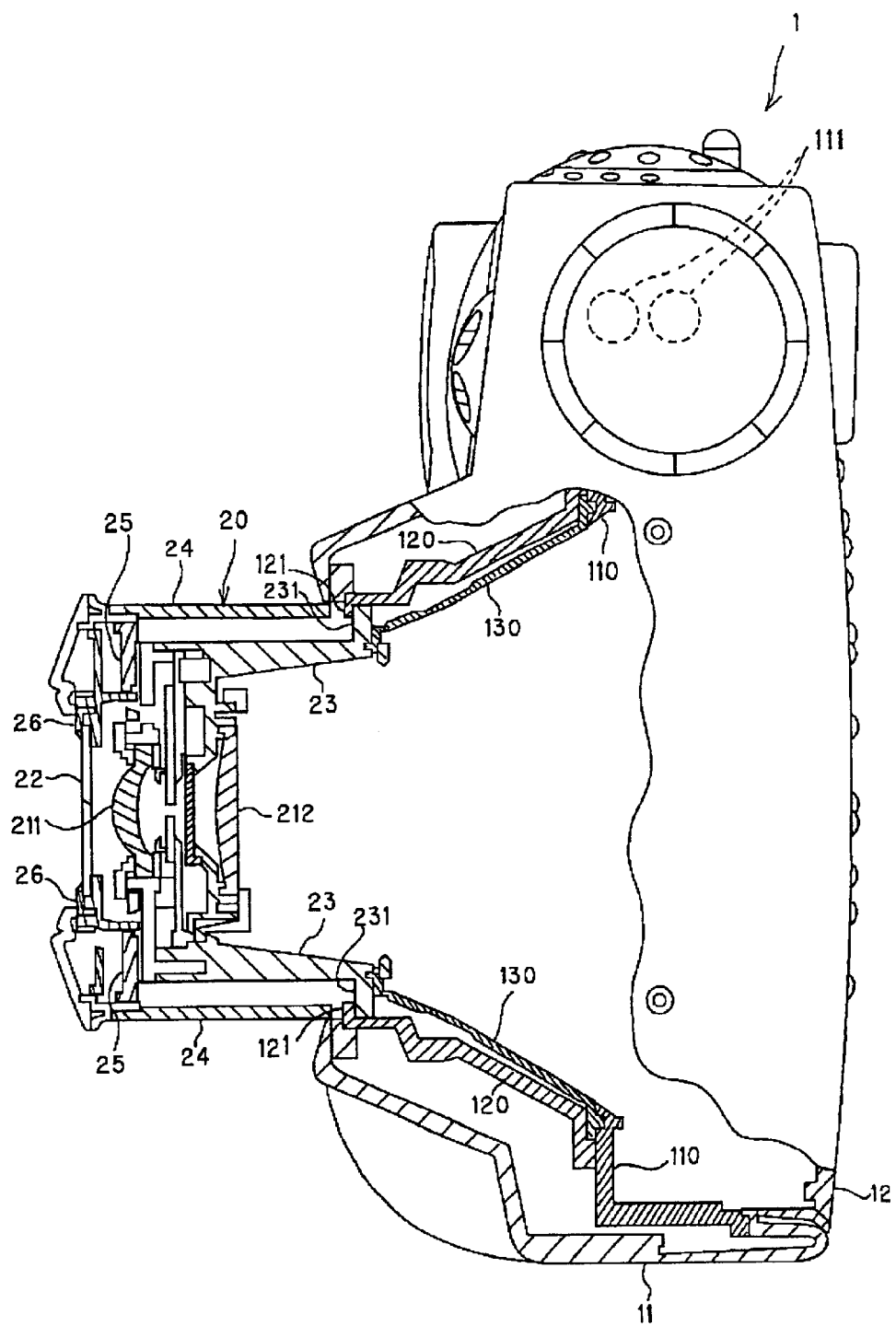
FIG. 3 is a partly cross sectional view obtained by cutting off a part of a left side surface of the camera in a state that a lens camera cone is reeled out to a predetermined reel-out position.

FIG. 3 is a partly cross sectional view obtained by cutting off a part of a left side surface of the camera in a state that a lens camera cone is reeled out to a predetermined reel-out position.

The camera main body of the camera 1 has a main body portion 110 and a fixed tube 120 receiving the sunk lens camera cone 20. In the lens camera cone 20, a first photographing lens 211 and a second photographing lens 212 are supported as a photographing lens. Further, a freely opened closed lens barrier 22 is arranged in a front surface of the first photographing lens 211. Further, the lens camera cone 20 has a shutter base 23 to which a shutter vane mentioned below or the like is attached, an outer tube 24 covering an outer periphery of the shutter base 23, a barrier ring 25 arranged in a front surface of the shutter base 23, and a barrier base 26 arranged in a front surface of the barrier ring 25. The shutter base 23, the outer tube 24, the barrier ring 25 and the barrier base 26 are integrally sunk or reeled out. Further, the camera 1 is provided with a light shielding rubber bellows 130 connecting between the shutter base 23 and the main body portion 110. Accordingly, it is possible to prevent a different light from the photographing light from being incident. Further, two developing rollers 111 are provided as shown by a dotted line in the main body portion 110. The developing rollers 111 are structured such as to discharge a film unit after exposure out of the camera while gripping the film unit, and in the film unit gripped by the developing rollers 111, the developing pod within the film unit is crushed and the developing solution is evenly developed between the photosensitive layer and the transferring layer, whereby a developing process and a transferring process are executed.

Next, a description will be given of a sinking operation and a reel-out operation of the lens camera cone with reference to FIGS. 4 and 5 together with FIG. 3.

Figure 4:
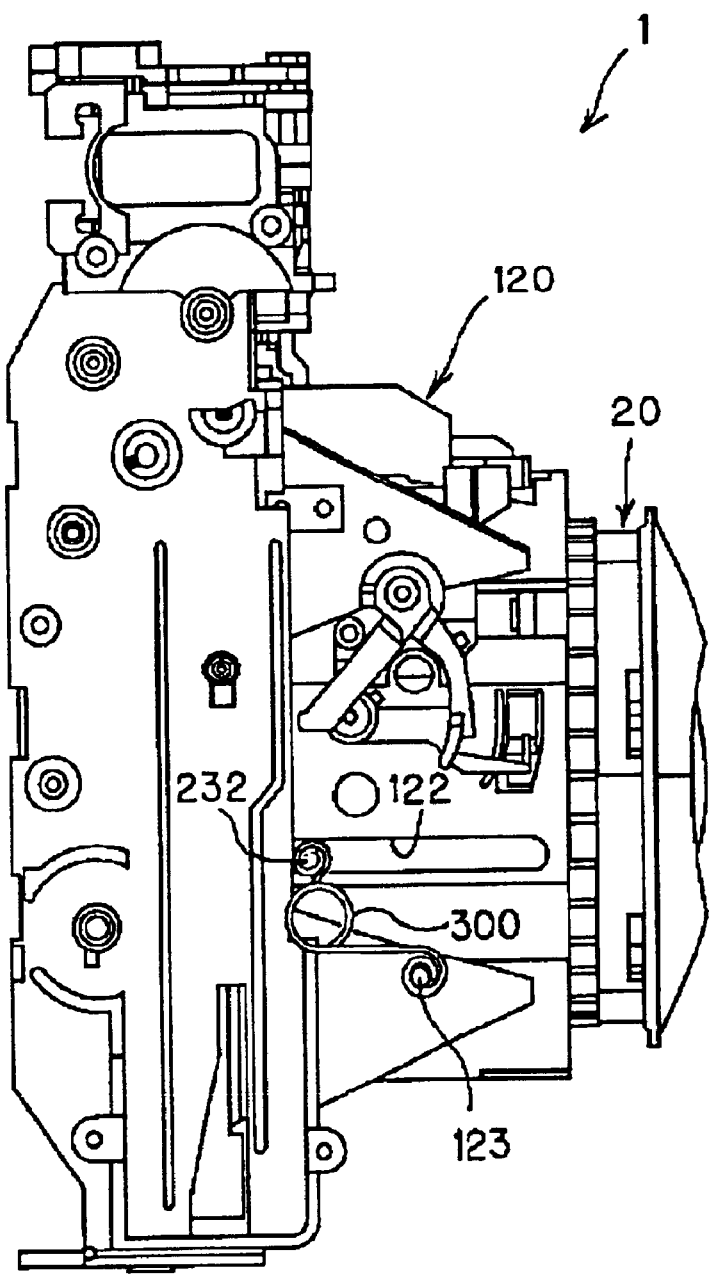
FIG. 4 is a view showing the camera in a state that the lens camera cone is sunk at a predetermined sinking position from a right side surface of the camera.
Figure 5:
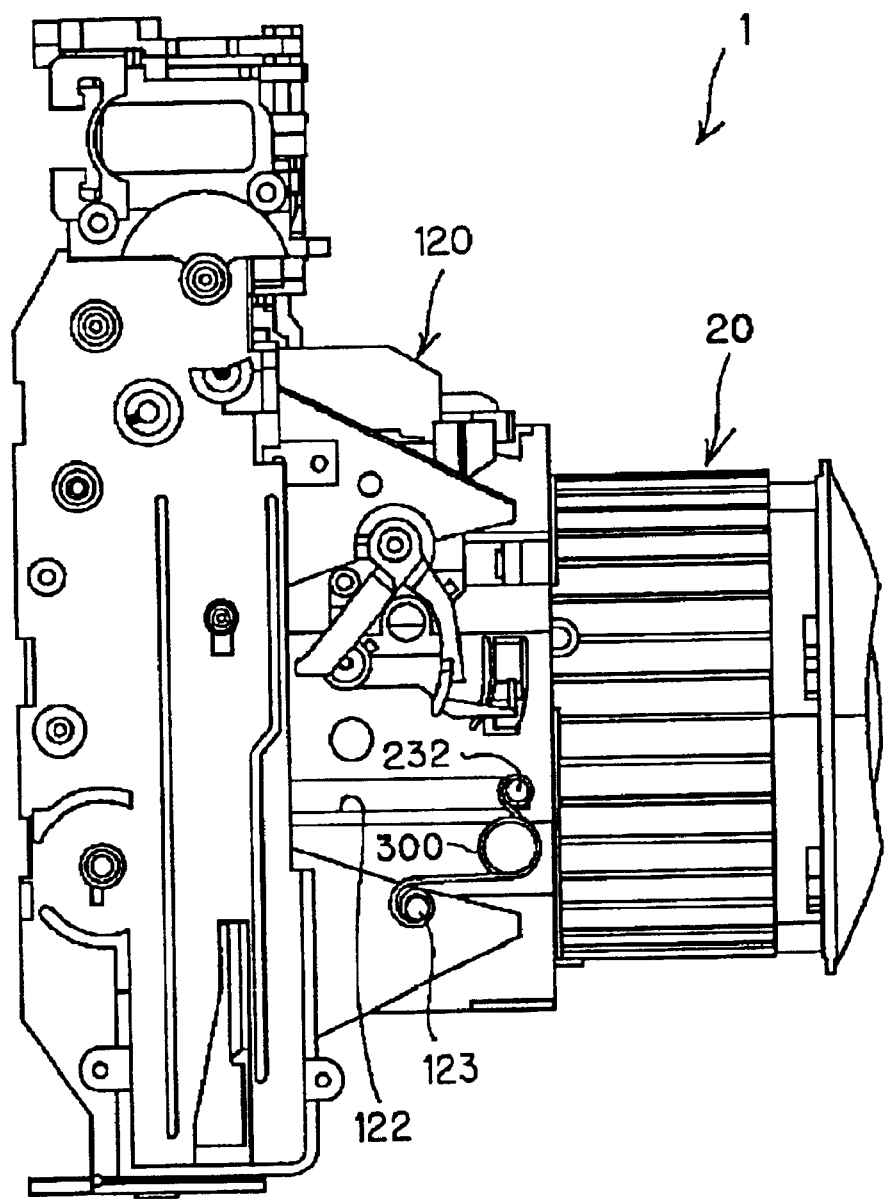
FIG. 5 is a view showing the camera in a state that the lens camera cone is reeled out to the predetermined reel-out position from the right side surface of the camera.

FIG. 4 is a view showing the camera in a state that the lens camera cone is sunk at a predetermined sinking position from a right side surface of the camera, and FIG. 5 is a view showing the camera in a state that the lens camera cone is reeled out to the predetermined reel-out position from the right side surface of the camera. The camera in both of FIGS. 4 and 5 is shown in a state that the front cover, the rear cover and the battery chamber cover are taken out.

When the lens camera cone 20 is sunk, the shutter base 23 shown in FIG. 3 is received by the main body portion 110 via the rubber bellows 130, and the lens camera cone 20 is positioned at a predetermined position (refer to FIG. 4). On the contrary, when the lens camera cone 20 is reeled out, a rear end edge 231 of the shutter base 23 shown in FIG. 3 is brought into contact with a front end edge 121 of the fixed tube 120, and the lens camera cone 20 is positioned at the predetermined reel-out position (refer to FIGS. 3 and 5). Accordingly, whoever manually operates, it is possible to reel out the lens camera cone 20 at the reel-out position or sink at the sinking position.

Further, an engagement projection 232 (refer to FIGS. 4 and 5) protruding outward is provided on an outer peripheral surface of the shutter base 23 shown in FIG. 3. Two engagement projections 232 are provided at an interval of 180 degrees in a peripheral direction of the shutter base 23. On the contrary, a long hole 122 extending in a reel-out direction of the lens camera cone 20 and an engagement projection 123 protruding outward are provided on an outer peripheral surface of the fixed tube 120, as shown in FIGS. 4 and 5. The long hole 122 is provided at a position aligned with a position at which the engagement projection 232 of the shutter base 23 protrudes, and the engagement projection 232 of the shutter base 23 is inserted to the long hole 122. Further, the engagement projection 123 of the fixed tube 120 is provided near a middle of the long hole 122. Each of the engagement projections 232 and 123 engages with an end portion of a toggle spring 300. In this case, in FIGS. 4 and 5, only one toggle spring 300 is illustrated, however, the toggle spring 300 is also provided at a position in an opposite side to the illustrated position in the shutter base 23, in the case of this camera 1. The lens camera cone 20 is energized toward the reel-out position by the toggle spring 300 when it exists near the reel-out position, and energized toward the sinking position when it exists near the sinking position. Accordingly, since the energizing force in the operating direction is applied at a time of reeling out the lens camera cone 20 to the position near the reel-out position or sinking the lens camera cone 20 to the position near the sinking position by the toggle spring 300, an operability is improved. Further, since the toggle springs 300 are provided at an interval of 180 degrees, it is possible to prevent the lens camera cone 20 from being inclined or being caught on the fixed tube 120, in the reel-out operation or the sinking operation of the lens camera cone 20. Further, the rubber bellows 130 shown in FIG. 3 also carries out a function of energizing the lens camera cone 20 toward the reel-out position, in the manual reeling out operation of the lens camera cone 20, whereby an operability is improved. In this case, a description will be given in detail of the rubber bellows with FIG. 6.

Figure 6A:
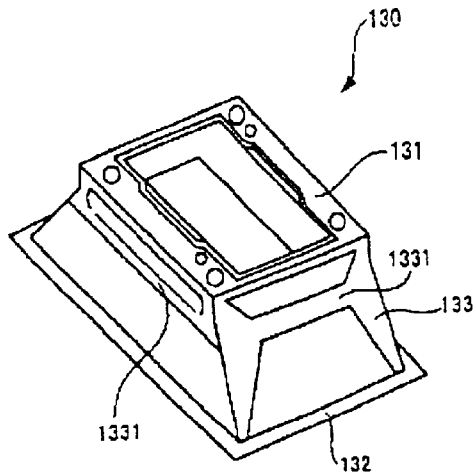
FIGS. 6A, 6B and 6C are perspective views respectively showing three states of a rubber bellows.
Figure 6B:
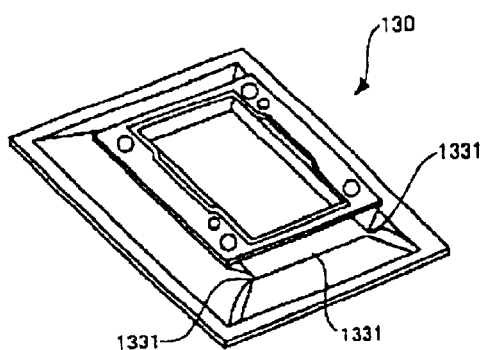
Figure 6C:
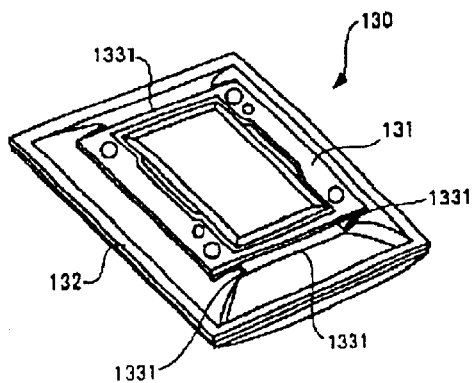

FIGS. 6A, 6B and 6C are perspective views respectively showing three states of the rubber bellows.

In FIGS. 6A, 6B and 6C, FIG. 6A is a perspective view of the rubber bellows at a time when the lens camera cone is reeled out to the predetermined reel-out position, FIG. 6B is a perspective view of the rubber bellows at a time when the lens camera cone is positioned between the predetermined reel-out position and the predetermined sinking position, and FIG. 6C is a perspective view of the rubber bellows at a time when the lens camera cone is sunk at the predetermined sinking position.

When the lens camera cone is reeled out to the predetermined reel-out position, the rubber bellows 130 is completely extended, and the shape at that time becomes a truncated pyramid shape as shown in FIG. 6A. The rubber bellows 130 is structured such as to have openings on a front surface 131 and a rear surface 132, respectively, and as shown in FIG. 3, a front surface peripheral edge is adhered to the shutter base 23 and a rear surface peripheral edge is adhered to the main body portion 110. Further, as shown in FIG. 6A, a recess portion 1331 is provided in a peripheral direction of a peripheral surface 133 connecting the front surface peripheral edge to the rear surface peripheral edge in the rubber bellows 130. A portion in the peripheral surface 133 in which the recess portion 1331 is provided is thinner than the other portions of the peripheral surface 133. The peripheral surface 133 of the rubber bellows 130 is folded up in this recess portion 1331 in correspondence to the movement of the lens camera cone from the reel-out state to the sinking state, and when the lens camera cone is sunk at the predetermined sinking position via the state shown in FIG. 6B, the peripheral surface 133 of the rubber bellows 130 is completely folded up as shown in FIG. 6C. The rubber bellows 130 shown in FIG. 6C is in a state that the front surface 131 enters into a portion lower than the rear surface 132 in the drawing so as to be turned over. When the rubber bellows 130 becomes in a turned over state, the energizing force energizing the lens camera cone 20 toward the reel-out position applied by the rubber bellows 130 is lost.

Subsequently, a description will be given in more detail of the internal structure of the camera 1 with reference to FIG. 7.

Figure 7:
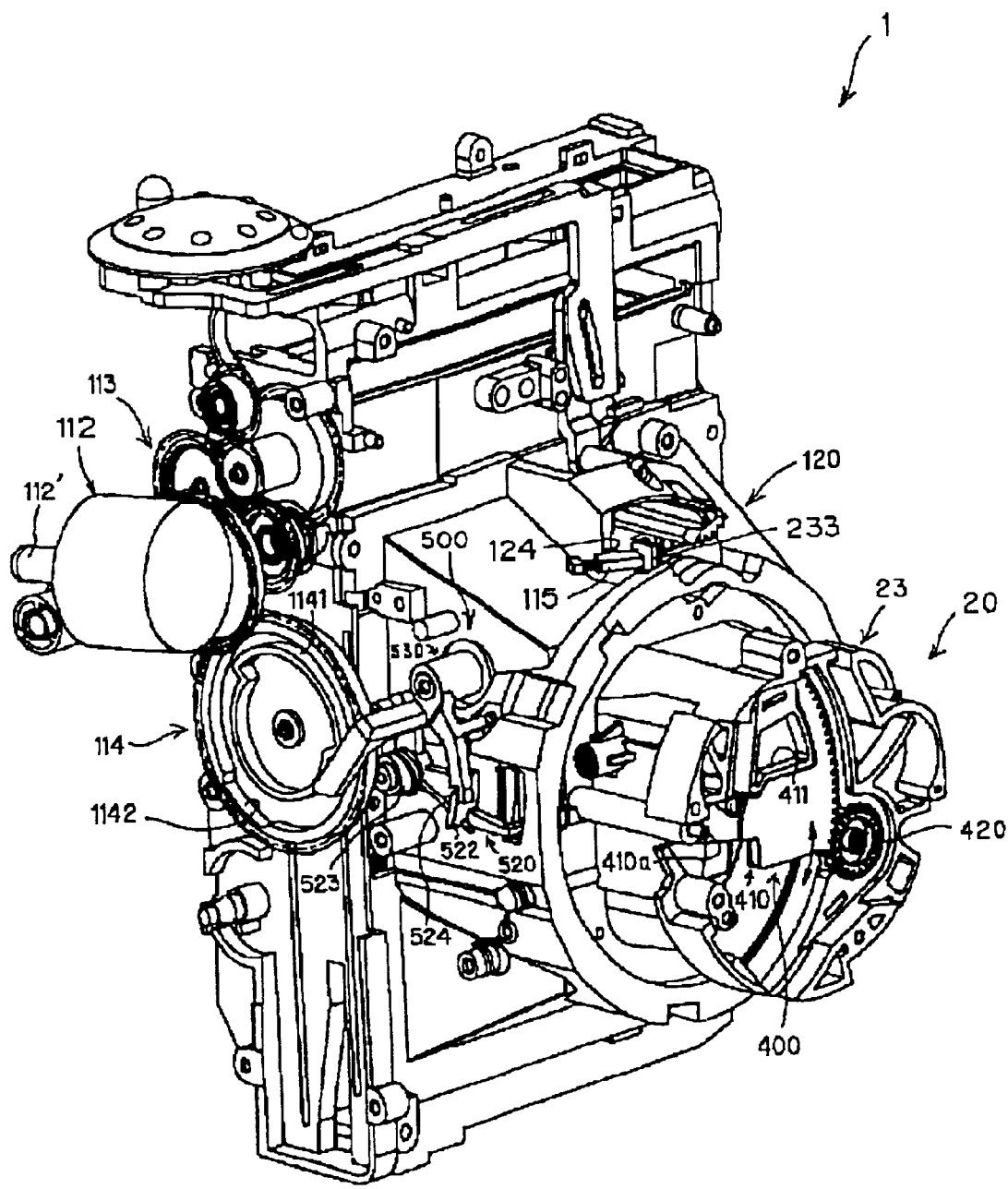
FIG. 7 is a perspective view showing the camera in a state that the lens camera cone is reeled out to the predetermined reel-out position.

FIG. 7 is a perspective view showing the camera in a state that the lens camera cone is reeled out to the predetermined reel-out position. In this case, the camera shown in FIG. 7 is structured such that the front cover, the rear cover and the battery chamber cover are taken out, and the outer tube and the like are taken out from the lens camera cone so as to show the shutter base.

The camera 1 is provided with a main power source switch 115 on an outer peripheral wall of the fixed tube 120. The main power source switch 115 corresponds to a contact switch having a non-deforming fixed electrode and a flexible electrode freely bending to the fixed electrode, and a detailed description with respect to a structure of the contact switch as mentioned above will be given later. A protruding piece 233 protruding outward is provided on the outer peripheral surface of the shutter base 23, and a notch hole 124 extending in the reel-out direction of the lens camera cone 20 is provided on the outer peripheral wall of the fixed tube 120. The protruding piece 233 of the shutter base 23 is inserted to the notch hole 124, and the protruding end of the protruding piece 233 protrudes out from the outer peripheral wall of the fixed tube 120. When the lens camera cone 20 sinks at the sinking position, the protruding end protruding from the fixed tube 120 in the protruding piece 233 is positioned at the rear of the main power source switch 115, and the main power source switch 115 is in an off state. On the contrary, the lens camera cone 20 is reeled out, the protruding end of the protruding piece 233 moves forward from the rear portion of the main power source switch 115 toward the main power source 115 in correspondence to the reel-out operation, and when the lens camera cone 20 is reeled out to the reel-out position, the main power source switch 115 is pushed by the protruding end of the protruding piece 233 as shown in FIG. 7, whereby the flexible electrode is in contact with the fixed electrode so as to be in an on state. That is, in the camera 1, the main power source switch 115 is set to be in the on state in accordance with the reel-out operation of the lens camera cone 20, and the main power source switch is set to be in the off state in accordance with the sinking operation of the lens camera cone 20, so that it is possible to easily operate the camera and it is possible to prevent the battery from being wastefully consumed due to neglecting of turning off the main power switch 115.

Subsequently, a description will be given of the shutter provided with the camera 1 with reference to FIG. 7. A shutter 400 is arranged in the lens camera cone 20 and is provided with a shutter vane 410 and a gear 420.

The shutter vane 410 is structured such as to execute an opening and closing operation in the front surface of the shutter base 23 around a rotary shaft 410*a* for the purpose of exposing the photographing light to a built-in film unit (not shown), and the opening and closing operation constitutes a shutter operation of the camera 1. Further, the shutter vane 410 is energized by a spring which is not shown, so as to be in a closed state, and the shutter vane 410 shown in FIG. 7 is in the closed state. The shutter vane 410 rotates around the rotary shaft 410*a* in a clockwise direction against the energizing force applied by the spring which is not shown, so as to position an opening 411 at an incident path of the photographing light, thereby exposing the photographing light to the film unit. Thereafter, the shutter vane 410 having rotated in the clockwise direction rotates in a counter clockwise direction due to the energizing force applied by the spring which is not shown, so as to return in the closed state. Further, the gear 420 is provided on the front surface of the shutter base 23, and the shutter vane 410 is engaged with the gear 420. Due to this engagement, an opening and closing speed of the shutter vane 410 is limited, and the engagement constitutes a governor mechanism. In the present embodiment, since it is possible to make a speed at which the shutter vane 410 opens low by the governor mechanism and the energizing force of the spring energizing the shutter vane 410 at a time when the shutter vane 410 opens, it is possible to prevent a negative effect generated by a matter that the speed at which the shutter vane opens is too fast.

Next, a description will be given in more detail of the members provided in the inner portion of the camera main body with reference to FIG. 8 together with FIG. 7.

Figure 8:
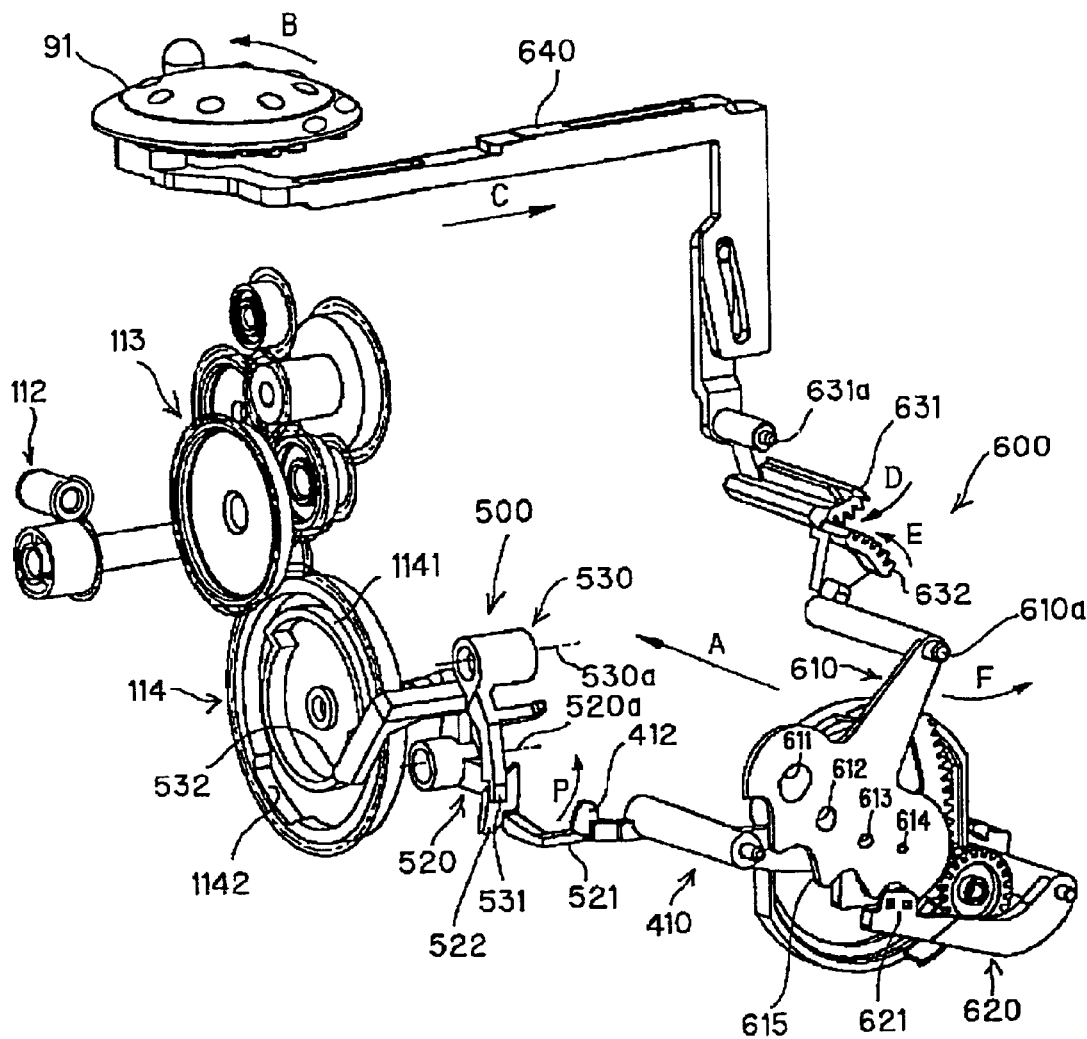
FIG. 8 is a perspective view showing a part of an interior structure of the camera in a state that the lens camera cone is reeled out to the predetermined reel-out position.

FIG. 8 is a perspective view showing a part of the interior structure of the camera in a state that the lens camera cone is reeled out to the predetermined reel-out position.

One motor 112 is arranged in the camera main body, and a rotary shaft 112' of the motor is shown in FIG. 8. Further, the camera main body is provided with a speed reduction gear 113 and a cam gear 114 corresponding to a rotary cam.

The motor 112 is structured such as to start rotating in accordance with a push-down operation of the release button 30, and a rotational driving force is transmitted to the cam gear 114 via the speed reduction gear 113 and is also transmitted to the developing roller 111 shown in FIG. 3.

The cam gear 114 is structured such as to rotate in one direction in accordance with the rotational driving force of the motor 112, a first cam surface 1141 is provided in a peripheral direction on a surface of the cam gear 114, and a second cam surface 1142 is provided in a peripheral direction in an outer side of the first cam surface 1141.

Further, as shown in FIG. 8, a flange 412 is provided in a rear end of the shutter vane 410. In this camera 1, the shutter vane 410 is opened by kicking up the flange 412 by a shutter charge mechanism described below with reference to FIGS. 7 and 8.

The shutter charge mechanism 500 provided in this camera 1 is arranged, as shown in FIG. 7, in the camera main body, and has a charge lever 520 and a set lever 530.

In FIG. 8, the charge lever 520 is structured such that a front end portion 521 is connected to the flange 412 of the shutter vane 410. However, FIG. 8 is a perspective view showing a part of the internal structure in a state that the lens camera cone is reeled out to the predetermined reel-out position, the lens camera cone is structured such as to freely sink in a direction of an optical axis (refer to an arrow A in FIG. 8), and the front end portion 521 of the charge lever 520 and the flange 412 of the shutter vane 410 are connected on that particular occasion that the lens camera cone 20 is reeled out to the predetermined reel-out position. Further, the charge lever 520 is structured such as to rotate around a rotary shaft 520*a* shown in FIG. 8, a contact surface 522 with which a front end portion 531 of the set lever 530 is brought into contact is provided in a middle portion of the charge lever 520, and a rear end of the charge lever 520 is positioned on a back surface of the cam gear 114. Further, the illustration is omitted in FIG. 8, however, as shown in FIG. 7, a spring 524 for energizing the charge lever 520 in a direction (an upward direction in FIGS. 7 and 8) in which a front end portion of the charge lever 520 kicks up a flange of the shutter vane 410 is fitted to a bearing 523 of a rotary shaft in the charge lever 520, and one end of the spring 524 is engaged with the contact surface 522. The charge lever 520 kicks up the flange 412 of the shutter vane 410 due to an energizing force of the spring 524 so as to make the shutter 400 execute the shutter operation. In accordance with the present embodiment, since there is provided the connecting mechanism between the front end portion 521 and the flange 412 which is connected only at a time of reeling out, it is possible to prevent the photographing light from being exposed to the film unit even if the release button 30 is erroneously pressed down at a time when the lens camera cone 20 is at the sinking state.

The set lever 530 rotates around a rotary shaft 530*a* shown in FIG. 8, and has a cam follower 532 being in contact with the first cam surface 1141. Further, as mentioned above, the front end portion 531 of the set lever 530 is brought into contact with the contact surface 522 of the charge lever 520. Further, the set lever 530 is energized toward a reverse direction (a downward direction in FIGS. 7 and 8) to the direction in which the charge lever 520 is energized, due to a spring which is not shown, having a greater energizing force than that of the spring 524 (refer to FIG. 7) energizing the charge lever 520, and the cam follower 532 is energized toward the first cam surface 1141. FIG. 8 shows a state that the front end portion 521 of the charge lever 520 is prevented from kicking up the flange 412 of the shutter vane 410 on the basis of the energizing force of the spring 524 shown in FIG. 7, by the set lever 530.

Subsequently, a description will be given of a lens stop member 600 with reference to FIG. 9 together with FIG. 8.

Figure 9:
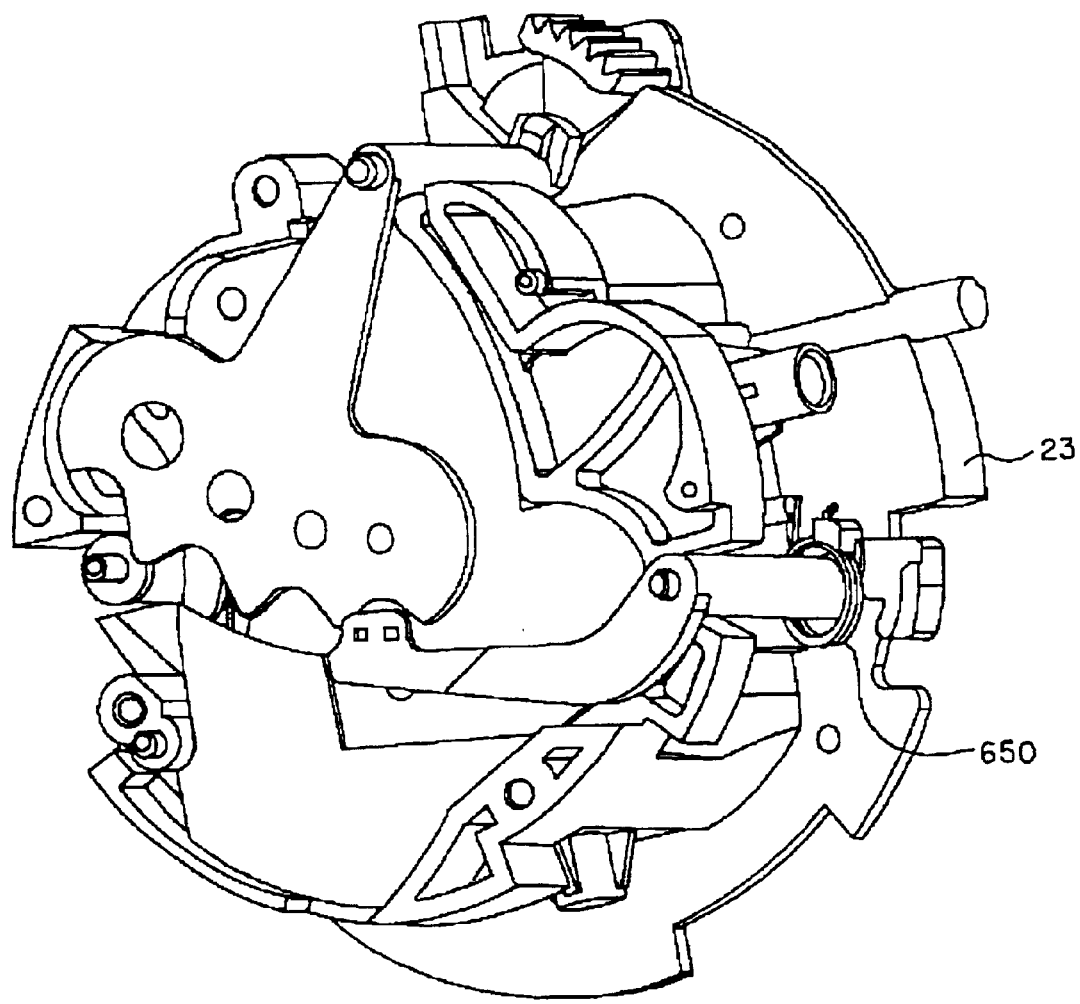
FIG. 9 is a perspective view showing a shutter base in a state of taking out a fixed tube.

FIG. 9 is a perspective view showing the shutter base in a state of taking out the fixed tube.

The lens stop member 600 shown in FIG. 8 is provided with a lens stop plate (an aperture plate) 610 and a click lever 620, and further has two connection gears 631 and 632 engaged with each other, an operation rod 640 connected to the lens stop setting dial 91, and a click lever energizing spring 650 shown in FIG. 9. The lens stop plate 610 is arranged in a front surface of the shutter vane 410, and four openings 611, 612, 613 and 614 having different sizes are provided in the lens stop plate 610. That is, in the lens stop plate 610, the largest opening 611 is provided in a left side in FIG. 8, and the openings 612, 613 and 614 which become smaller as going toward a right side are provided. Further, the lens stop plate 610 is energized in a direction opposite to a clockwise direction in FIG. 8, by a lens stop plate energizing spring which is not shown in FIG. 8. Further, a saw tooth-like engagement portion 615 is provided in the lens stop plate 610, and is engaged with a front end portion 621 of the click lever 620. The front end portion 621 of the click lever 620 is energized to a side of the lens stop plate 610 by the click lever energizing spring 650 engaged with the shutter base 23 shown in FIG. 9. However, the lens stop plate 610 is structured such as to rotate around the rotary shaft 610a against the engagement force of the front end portion 621 in the click lever 620 by an application of the rotating operation of the lens stop setting dial 91. Further, in the case that the rotating operation for increasing the lens stop value is applied by the lens stop setting dial 91, the lens stop plate 610 rotates against the energizing force applied by the lens stop plate energizing spring for energizing the lens stop plate 610 itself. That is, the operation rod 640 is pushed or pulled due to an application of the operation of the lens stop setting dial 91, whereby the connection gear 631 in the side of the lens stop setting dial 91 swings around a shaft 631a. Accordingly, the connection gear 632 in the side of the lens stop plate 610 also swings around the shaft 610a and the lens stop plate 610 rotates. For example, as shown by respective arrows in FIG. 8, when rotating the lens stop setting dial 91 in a direction (refer to an arrow B) opposite to a clockwise direction, the operation rod 640 is pressed toward a right side in FIG. 8 (refer to an arrow C), and the connection gear 631 in the side of the lens stop setting dial 91 swings in the clockwise direction around the shaft 631a (refer to an arrow D). As a result, the connection gear 632 in the side of the lens stop plate 610 swings in the direction opposite to the clockwise direction around the shaft 610a (refer to an arrow E), and the lens stop plate 610 rotates in the direction opposite to the clockwise direction (refer to an arrow F). As mentioned above, due to the application of the operation of the lens stop setting dial 91, the lens stop plate 610 is set to any one lens stop value among four lens stop values corresponding to the magnitudes of four openings 611, 612, 613 and 614. Accordingly, in comparison with the camera in which the lens stop value is automatically set, it is possible to restrict a cost of the camera.

Further, a description will be given of the lens stop member 600 with reference to FIG. 10.

Figure 10:
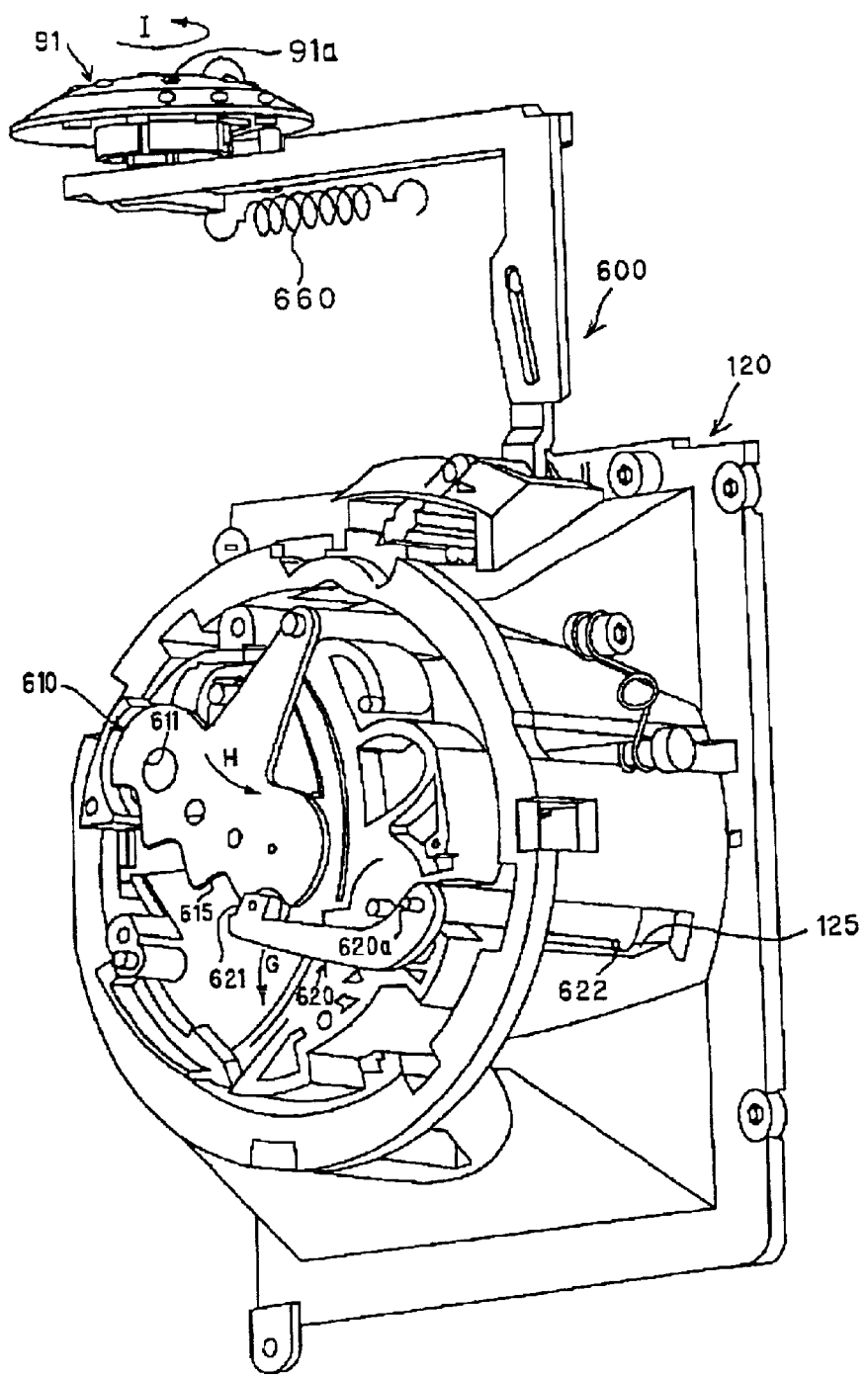
FIG. 10 is a perspective view showing the fixed tube and a lens stop member (an aperture member) in the middle of sinking the lens camera cone.

FIG. 10 is a perspective view showing the fixed tube and the lens stop member in the middle of sinking the lens camera cone.

The illustration is omitted in FIG. 8, however, the lens stop member 600 has a lens stop plate energizing spring 660 in which one end is engaged with the operation rod 640 and another end is engaged with the side of the camera main body. The lens stop plate 610 is energized by the lens stop plate energizing spring 660 in a direction that the largest opening 611 is positioned on the incident path of the photographing light. The click lever 620 provided in the lens stop member 600 rotates around the rotary shaft 620a. When the sinking operation of the lens camera cone is executed, the rear end portion 622 of the click lever 620 runs on an inclined surface 125 provided in the fixed tube 120 in the middle of the sinking operation, and rotates around the rotary shaft 620a as shown by an arrow G in FIG. 10 against an energizing force of the click lever energizing spring 650 shown in FIG. 9 for energizing the click lever 620, where by an engagement between the front end portion 621 of the click lever 620 and the engagement portion 615 of the lens stop plate 610 is removed. Accordingly, the lens stop plate 610 rotates due to the energizing force applied by the lens stop plate energizing spring 660 energizing the lens stop plate 610 itself so that the largest opening 611 is positioned on the incident path of the photographing light (refer to an arrow H), and returns to the lens stop value corresponding to the largest opening 611, and the lens stop setting dial 91 rotates so that the index 91a aligns with the position of the light emitting device corresponding to the lens stop value of the largest opening 611 (refer to an arrow I). When the lens camera cone 20 sinks to the predetermined sinking position, the rear end portion 622 of the click lever 620 drops down from the inclined surface 125 of the fixed tube 120, and the front end portion 621 of the click lever 620 is again engaged with the engagement portion 615 of the lens stop plate 610 due to the energizing force of the click lever energizing spring 650 shown in FIG. 9 for energizing the click lever 620.

In this case, the camera of the type such as the camera 1 is overwhelmingly frequently used indoor. Further, the lens stop value corresponding to the largest opening 611 corresponds to a most suitable lens stop value for photographing indoor among the lens stop values of the camera 1. In accordance with the present embodiment, since the structure is made such that the lens stop value is switched by manually rotating the lens stop setting dial 91, it is possible to reduce the burden at a time when the user operates the lens stop setting dial 91, by returning the lens stop plate 610 to the lens stop value corresponding to the largest opening 611, and it is possible to reduce a possibility of photographing error due to neglecting the lens stop value set as much as possible. However, on the contrary, in the camera of the type which is overwhelmingly frequently used outdoor, it is preferable to return to the lens stop value corresponding to the smallest opening 614, or in the camera of the type which is in half used indoor and outdoor, it is preferable to return to the lens stop value corresponding to the opening having the middle magnitude. Further, since the camera 1 utilizes the sinking operation of the lens camera cone 20 at a time of returning to the lens stop value of the largest opening 611, it is possible to prevent the lens stop value from being set to the lens stop value of the largest opening 611 due to a carelessness at a time of photographing.

In this case, in this camera 1, the connection gear 631 in the side of the lens stop setting dial 91 is made long as shown in FIG. 8 so that the engagement between the connection gears 631 and 632 is not removed by any of the reel-out operation and the sinking operation of the lens camera cone 20, however, the structure is not limited to this, the connection gear 632 in the side of the lens stop plate 610 is made long, or both of them are made long.

Next, a description will be given of a lens barrier with reference to FIGS. 11 and 12.

Figure 11:
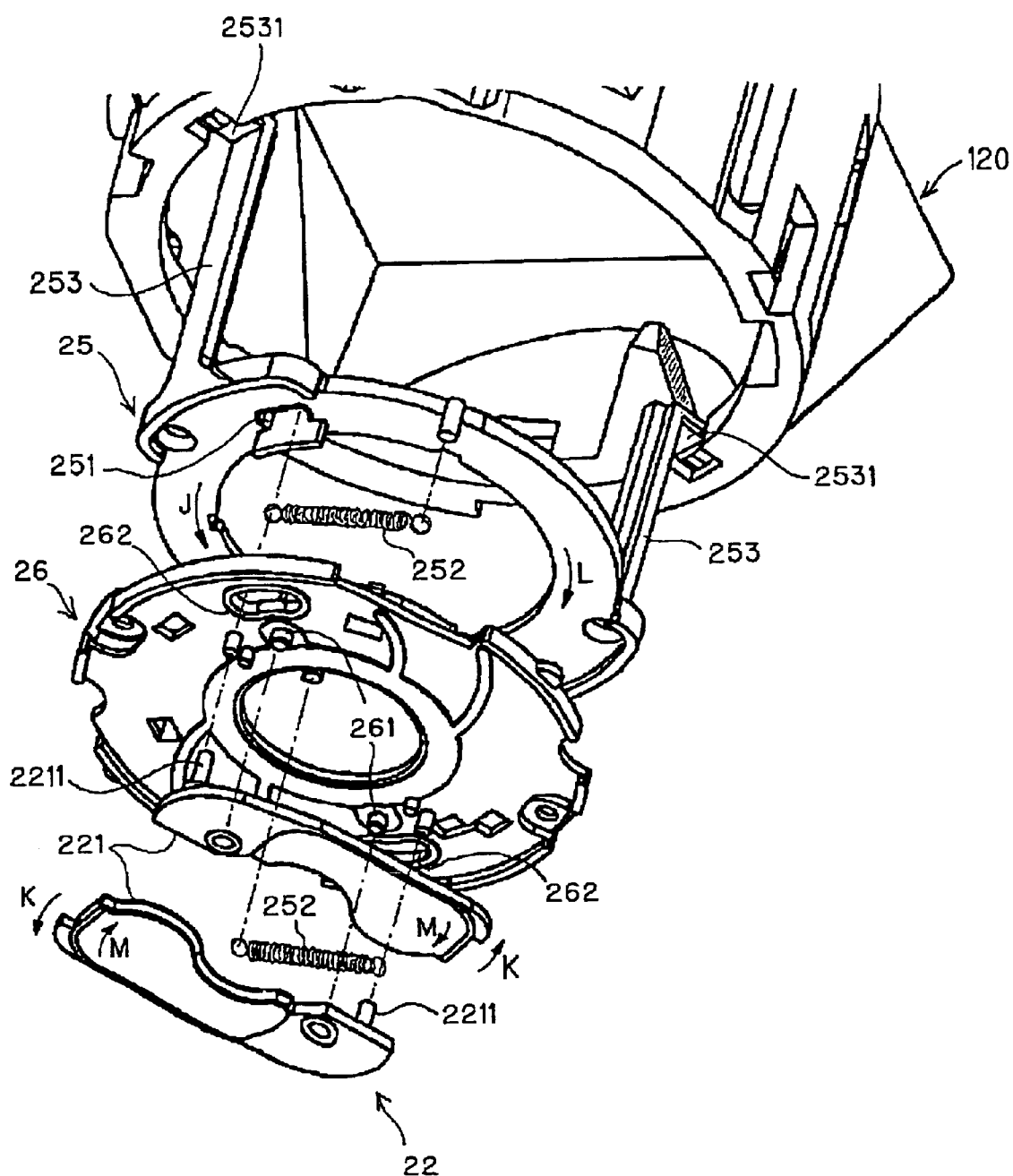
FIG. 11 is an exploded perspective view of a part of the lens camera cone from which the shutter base and an outer tube are taken out.
Figure 12:
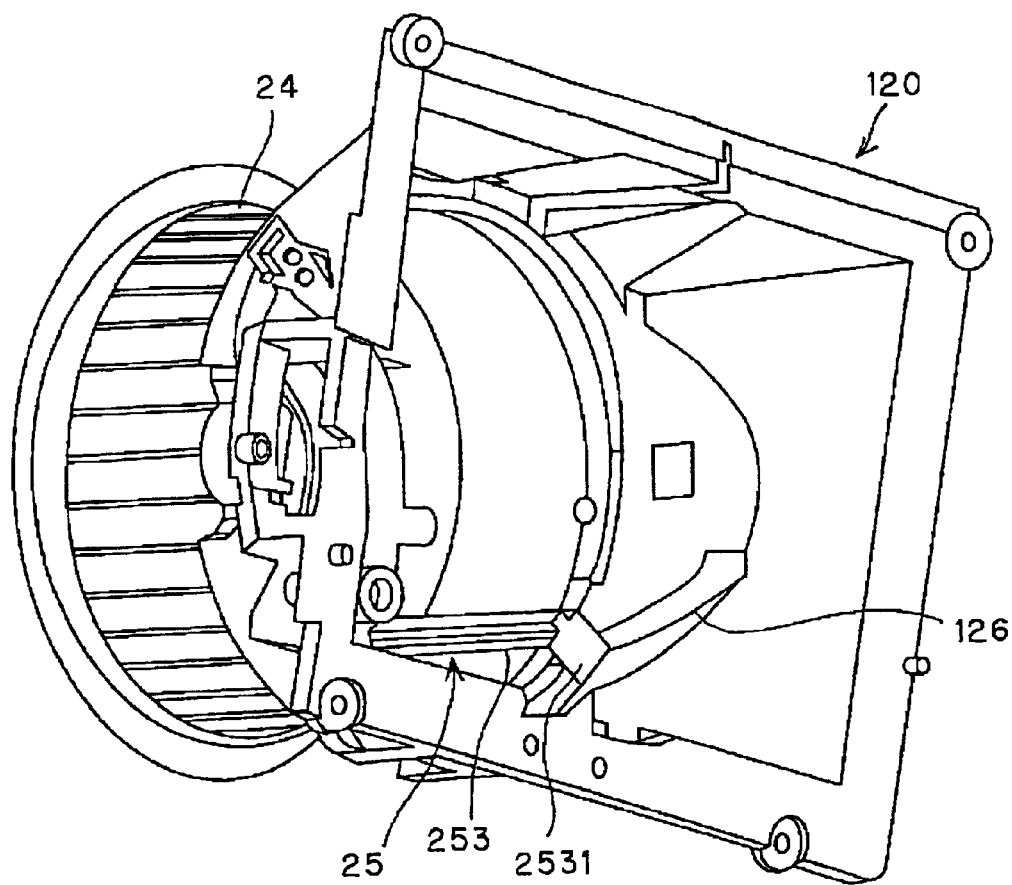
FIG. 12 is a perspective view at a time of seeing the lens camera cone reeled out to the predetermined reel-out position from the side of the camera main body in a state of taking out the shutter base.

FIG. 11 is an exploded perspective view of a part of the lens camera cone from which the shutter base and the outer tube are taken out, and FIG. 12 is a perspective view at a time of seeing the lens camera cone reeled out to the predetermined reel-out position from the side of the camera main body in a state of taking out the shutter base.

The lens barrier 22 shown in FIG. 11 is provided with two vane members 221. These two vane members 221 are pivoted to the barrier base 26. Pins 261 constituting respective centers of rotation of these two vane members 221 are provided in the barrier base 26, and the vane members 221 rotate around the pins 261. Further, these two vane members 221 respectively have sliding pins 2211, and the barrier base 26 has two insertion holes 262 to which the sliding pins 2211 are inserted, in a peripheral direction. Further, two insertion holes 251 to which the sliding pins 2211 are inserted are provided in a peripheral direction of the barrier ring 25, and one end of a coil spring 252 is engaged with the barrier ring 25. Another end of the coil spring 252 is engaged with the front end portion inserted to the insertion hole 251 of the barrier ring 25 via the insertion hole 262 of the barrier base 26, in the sliding pin 2211. Further, the barrier ring 25 is provided with two sliding rods 253, and sliding portions 2531 are provided in the respective sliding rods 253. Further, a protruding guide wall 126 for guiding each of the sliding portions 2531 is obliquely provided on an inner peripheral wall of the fixed tube 120 shown in FIG. 12. The sliding rod 253 is positioned on the inner peripheral wall surface of the fixed tube 120, and the sliding portion 2531 is brought into contact with the guide wall 126. Accordingly, the barrier ring 25 moves in a moving direction of the lens camera cone while rotating in accordance with the reel-out operation and the sinking operation of the lens camera cone. On the contrary, the barrier base 26 shown in FIG. 11 is fixed to the outer tube 24 shown in FIG. 12 and can not rotate. Accordingly, as shown in FIG. 11, when the lens camera cone is reeled out and the barrier ring 25 rotates in the direction (refer to an arrow J) opposite to the clockwise direction, each of two vane members 221 rotates in the direction (refer to an arrow K) opposite to the clockwise direction around the pin 261, and the lens barrier 22 is opened. On the contrary, when the lens camera cone is sunk and the barrier ring 25 rotates in the clockwise direction (refer to an arrow L), each of two vane members 221 also rotates in the clockwise direction (refer to an arrow M) and the lens barrier 22 is closed. As mentioned above, in accordance with the present embodiment, the opening and closing operation of the lens barrier 22 is executed by utilizing the sinking operation and the reel-out operation of the lens camera cone 20 in accordance with a manual operation. In this case, the coil spring 252 is structured such as to energize the lens barrier 22 in the closing direction, and prevents the lens barrier 22 from carelessly opening in a state that the lens camera cone sinks at the sinking position.

Further, a description will be given in detail of the members provided near the cam gear 114 with reference to FIGS. 13 and 14.

Figure 13:
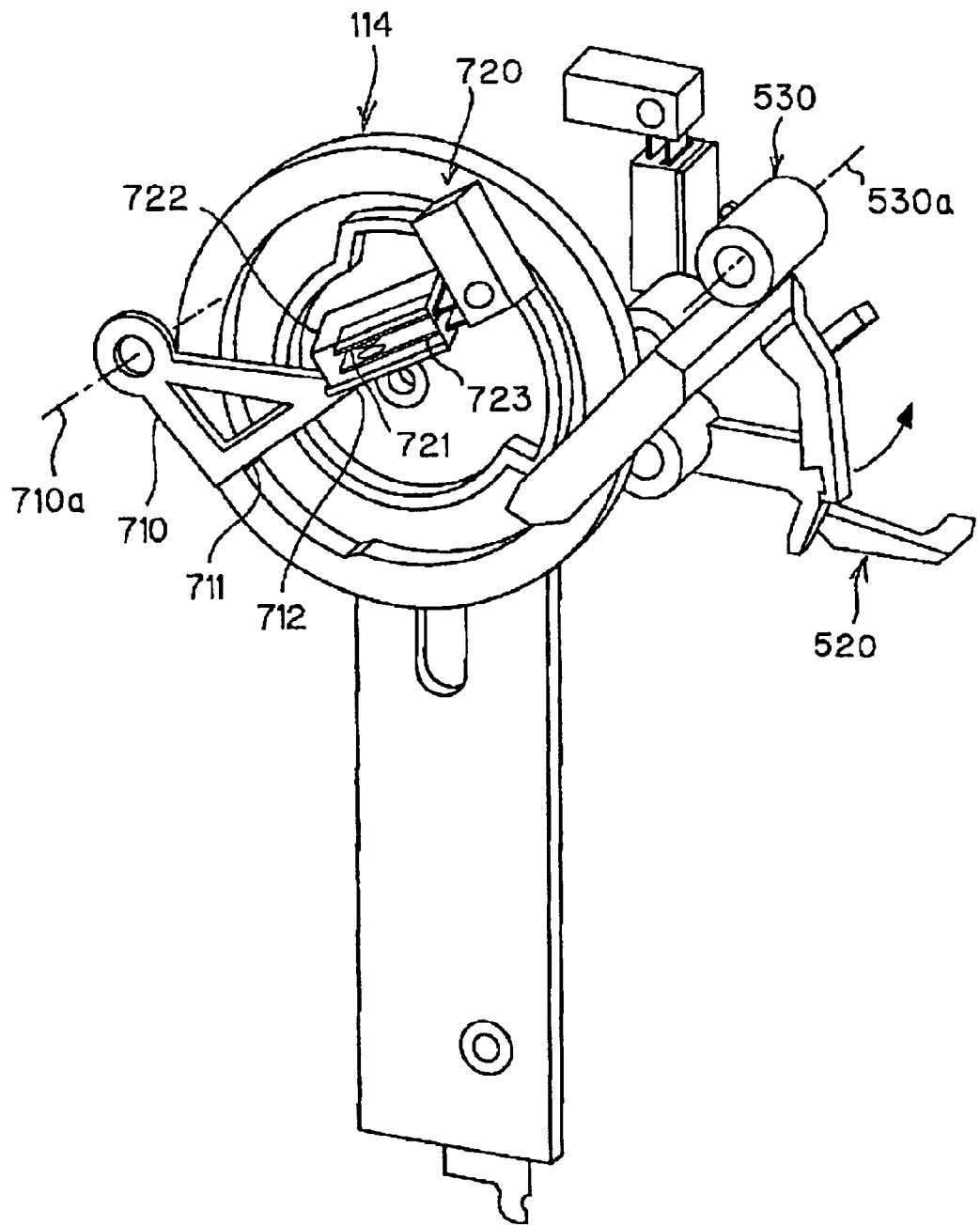
FIG. 13 is a perspective view obtained by seeing a cam gear and a member provided near the cam gear from a front surface side of the cam gear.
Figure 14:
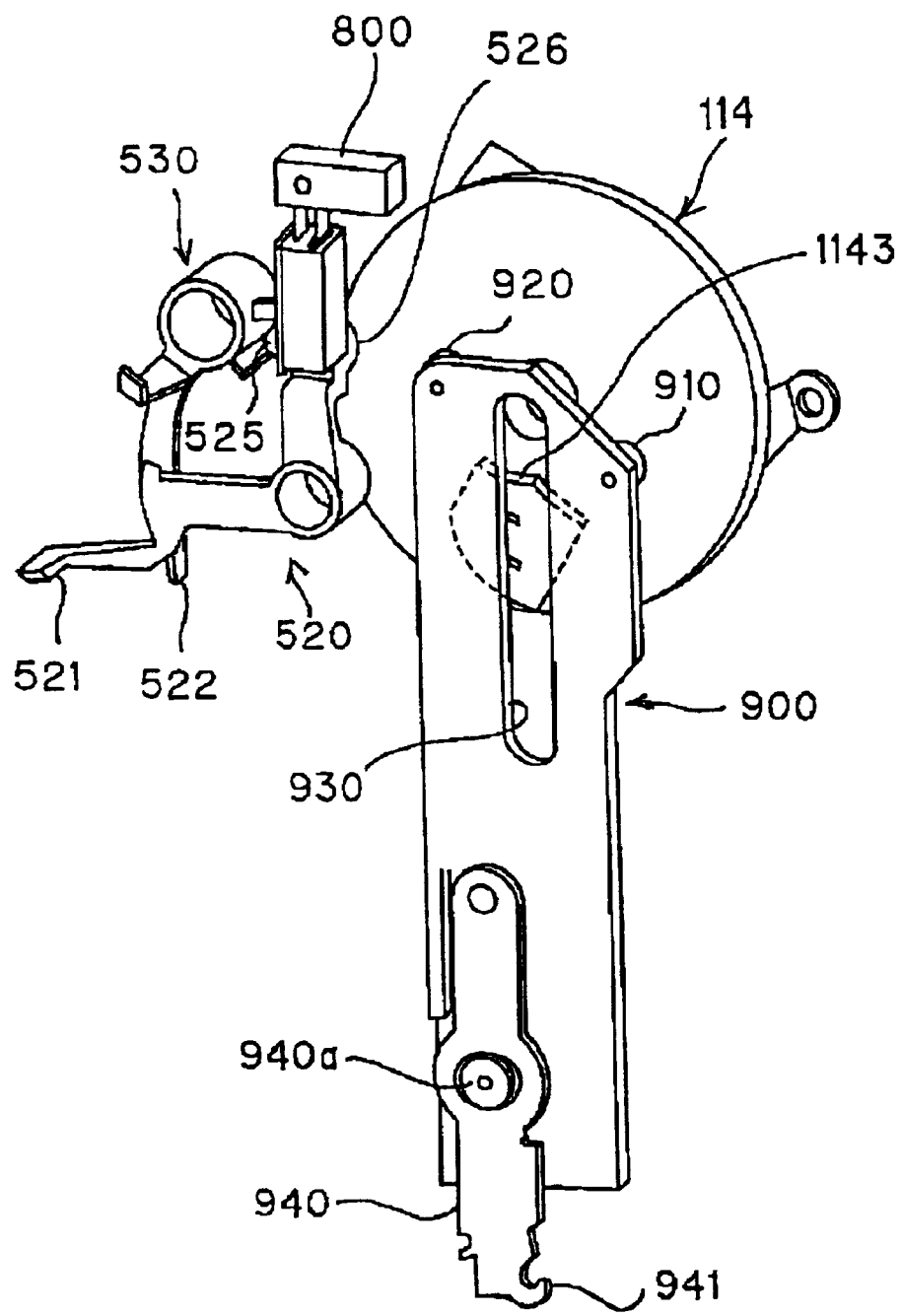
FIG. 14 is a perspective view obtained by seeing the cam gear and the member provided near the cam gear from a back surface side of the cam gear.

FIG. 13 is a perspective view obtained by seeing the cam gear and the member provided near the cam gear from the front surface side of the cam gear, and FIG. 14 is a perspective view obtained by seeing the cam gear and the member provided near the cam gear from the back surface side of the cam gear.

As shown in FIG. 13, in addition to the set lever 530, a cam switch lever 710 and a cam switch 720 are provided near the front surface of the cam gear 114.

The cam switch lever 710 is structured such as to rotate around a rotary shaft 710a, has a cam follower 711 being in contact with the second cam surface 1142 in a middle portion, and has a contact portion 712 being in contact with the cam switch 720 in a front end portion.

The cam switch 720 is a contact switch having the same structure as the structure of the main power source switch 115 mentioned above, and has a non-deforming fixed electrode 721 and a flexible electrode 723 adhered to a casing 722, as shown in FIG. 13 in an internally perspective manner. The flexible electrode 723 bends to the fixed electrode 721 in accordance with that the casing 722 is pressed by the external force, the cam switch 720 becomes in an on state in accordance with that the flexible electrode 723 is brought into contact with the fixed electrode 721, and the flexible electrode 723 moves apart from the fixed electrode 721 due to an elastic force in accordance with that the external force is cancelled, whereby the cam switch 720 becomes in an off state. A control portion which is not shown, provided in the camera 1 detects that the cam switch 720 mentioned above is changed to be in an off state from an on state so as to stop the rotation of the motor 112 shown in FIG. 7, thereby finishing the rotation of the cam gear 114 and stopping the rotational driving of the developing roller 111 shown in FIG. 3. In this case, as mentioned above, the rotation of the motor 112 is started on the basis of the operation of the release switch 30, and has no relation to the matter that the cam switch 720 is changed to be in the on state.

On the contrary, as shown in FIG. 14, a cam member 1143 is provided on a back surface of the cam gear 114, and in addition to the charge lever 520, a synchronous switch 800 and a holding plate 900 are provided near the back surface of the cam gear 114.

The charge lever 520 has a front end portion 521 connected to the flange 412 of the shutter vane and a contact surface 522 with which the front end portion of the set lever 530 is brought into contact, as mentioned above, further has a pin 525 pressing the synchronous switch 800 in accordance with the rotation of the charge lever 520, and has a cam follower 526 being in contact with the cam member 1143 in accordance with the rotation of the cam gear 114, at a rear end positioned on the back surface of the cam gear 114.

The synchronous switch 800 corresponds to a contact switch having the same structure as the structure of the cam switch 720 mentioned above, and is switched from an off state to an on state, thereby instructing a light emission of the flash 40 to the control portion which is not shown. As shown in FIG. 1, since the flash 40 of the camera 1 is provided on the front surface of the camera 1, it is possible to shorten an arrangement of the wiring by providing the synchronous switch 800 near the cam gear 114 provided in the camera main body. Here, in the case that the brightness of field measured by the light measuring portion 60 is equal to or more than a predetermined threshold value, the control portion which is not shown, does not drive the flash 40 even when receiving the flash light emission instruction from the synchronous switch 800, and in the case that it is less than the predetermined threshold value, it drives the flash 40 on the basis of the flash light emission instruction, and stops the luminescence of the flash 40 on the basis of a light amount of the flash light reflecting on the subject and returning through the flash light receiving window 42.

The holding plate 900 has a first cam follower 910, a second cam follower 920, a long hole 930 and a claw hook 940. In this case, a fixed pin which is not shown, is inserted to the long hole 930. The first cam follower 910 and the second cam follower 920 are pressed up by the cam member 143 provided on the back surface of the cam gear 114 in accordance with the rotation of the cam gear 114, and a whole of the holding plate 900 moves toward the developing roller 111 shown in FIG. 3. The claw hook 940 is structured such as to swing around a shaft 940a, and a hook portion 941 is provided in a front end thereof. The hook portion 941 enters between the exposed film unit and the film unit which will be next exposed, among a plurality of film units laminated within the film pack, in accordance with the rotation of the cam gear 114, thereby engaging an edge of a lower end of the exposed film unit. The exposed film unit engaged with the hook portion 941 is scraped out from the film pack in accordance with the movement of the holding plate 900 so as to be moved to the developing roller 111.

Finally, a description will be given of a series of operations in the camera with reference to FIGS. 15 and 16.

Figure 15:
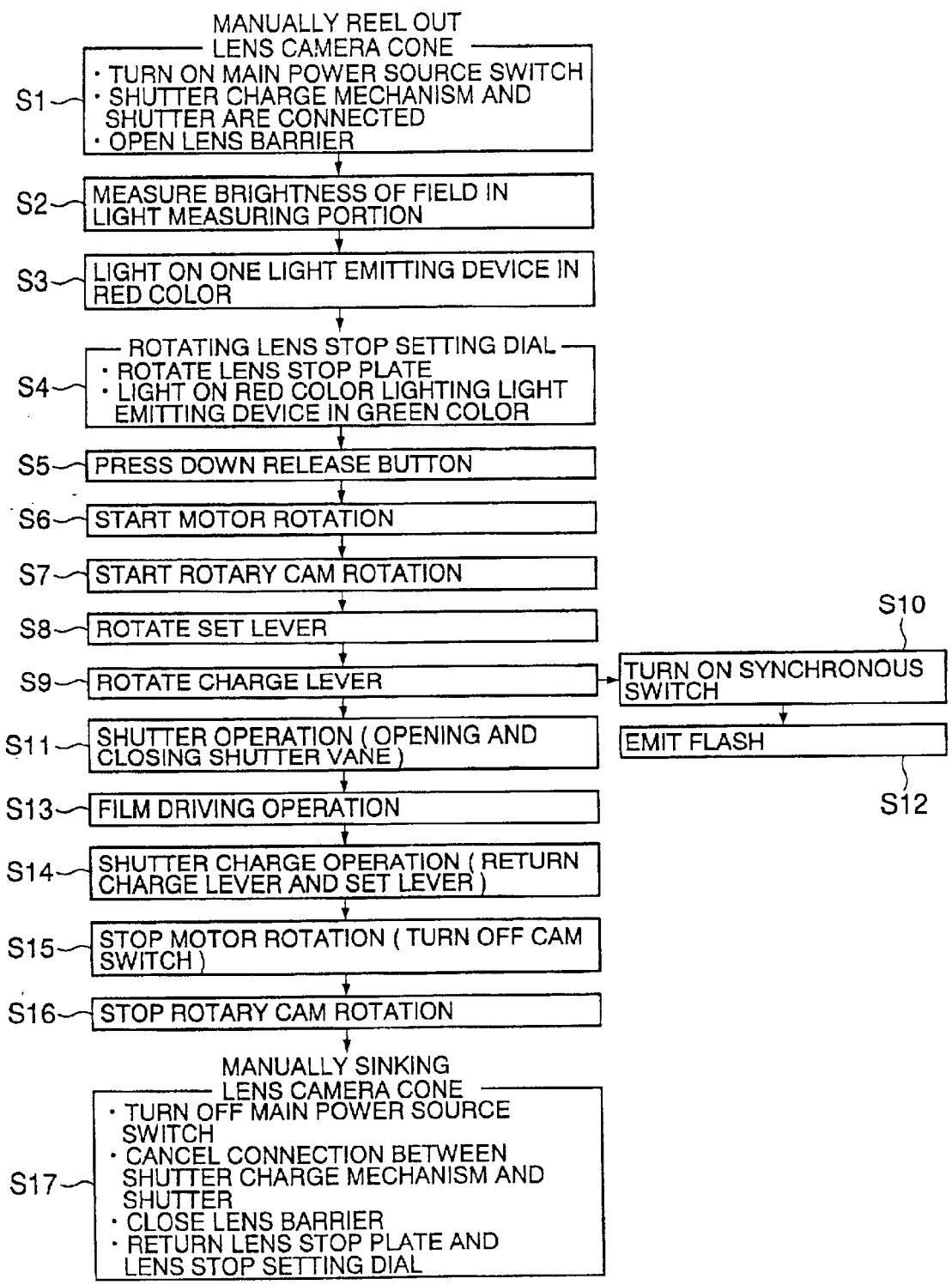
FIG. 15 is a flow chart showing a series of operations in the camera.

FIG. 15 is a flow chart showing a series of operations in the camera, and FIGS. 16A to 16E are views showing a state of the cam gear and the member being in contact with the cam gear in stages, after the cam gear starts rotating and until the cam gear finishes the rotation.

At first, the user puts a finger on the finger-engage portion 201 of the camera 1 shown in FIG. 1 so as to reel out the lens camera cone 20 sinking at the predetermined sinking position to the predetermined reel-out position (a step Si in FIG. 15). Then, as shown in FIG. 7, the main power source switch 115 is pressed by the protruding piece 233 so as to be in the on state. Further, as shown in FIG. 8, the front end portion 521 of the charge lever 520 and the flange 412 of the shutter vane 410 are connected to each other. That is, the shutter charge mechanism 500 and the shutter 400 are connected to each other. Further, the lens barrier 22 shown in FIG. 11 is opened.

Next, when the user trains the camera 1 on the subject, the light measuring portion 60 measures the brightness of field on the basis that the main power source switch 115 is in the on state (a step S2 in FIG. 15). In the case that the lens stop value corresponding to the measured brightness of field is different from the lens stop value of the largest opening 611, the light emitting device 92 (refer to FIG. 2) corresponding to the lens stop value in correspondence to the brightness of field is lighted in a red color (a step S3 in FIG. 15).

Thereafter, when the user rotates the lens stop setting dial 91 so as to align the index 91a with the light emitting device lighting in the red color, the lens stop plate 610 shown in FIG. 8 rotates in accordance with the operation of the lens stop setting dial 91, the lens stop value of the camera 1 is set to the lens stop value corresponding to the brightness of field, and the light emitting device 92 lighting in the red color is switched to the green color lighting (a step S4 in FIG. 15). In this case, when the camera 1 sinks the lens camera cone 20, the lens stop plate 610 returns to the lens stop value corresponding to the largest opening 611 as mentioned above, and the index 91a of the lens stop setting dial 91 returns to the position of the light emitting device corresponding to the lens stop value of the largest opening 611, so that if the lens stop value corresponding to the brightness of field is the lens stop value of the largest opening 611, the light emitting device lights in the green color from the beginning without lighting in the red color as in the step S3 mentioned above.

Figure 16A:
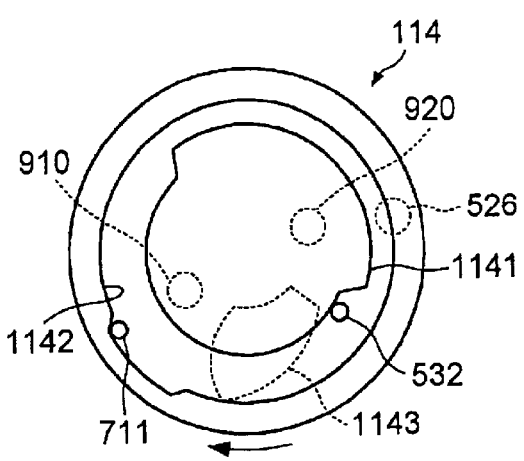
FIGS. 16A to 16E are views showing a state of the cam gear and a member being in contact with the cam gear in stages, after the cam gear starts rotating and until the cam gear finishes the rotation.

Further, when the user presses down the release button 30 (a step S5 in FIG. 15), the motor 112 shown in FIG. 7 starts rotating (a step S6 in FIG. 15), and the cam gear 114 shown in FIG. 16A starts rotating on the basis of the rotational driving force of the motor 112 (a step S7 in FIG. 15).

FIG. 16A is a view showing the state of the cam gear and the member being in contact with the cam gear at a time when the cam gear starts rotating. In this case, FIGS. 16A to 16E are views showing the state at a time of seeing from the front surface side of the cam gear 114, elements shown by dotted lines are positioned in the side of the back surface of the cam gear 114. Further, the cam gear 114 shown in the respective drawings is structured such as to rotate in a direction (refer to arrows shown in the respective drawings) opposite to the clockwise direction.

As shown in FIG. 16A, the cam follower 532 of the set lever is brought into contact with the first cam surface 1141 provided on the front surface of the cam gear 114, and the cam follower 711 of the cam switch lever is brought into contact with the second cam surface 1142 provided on the surface of the cam gear 114 in the same manner. Further, the cam member 1143 is provided on the back surface of the cam gear 114, the first cam follower 910 and the second cam follower 920 of the holding plate are positioned in the side of the back surface of the cam gear 114, and the cam follower 526 of the charge lever is positioned in the side of the back surface of the cam gear 114. In this case, the state of the cam gear 114 shown in FIG. 16A is the same as the state of the cam gear 114 shown in FIG. 8. Accordingly, as mentioned above, even when the front end portion 521 of the charge lever intends to kick up the flange of the shutter vane due to the energizing force of the spring 524 shown in FIG. 7, it is prevented by the set lever 530.

Figure 16D:
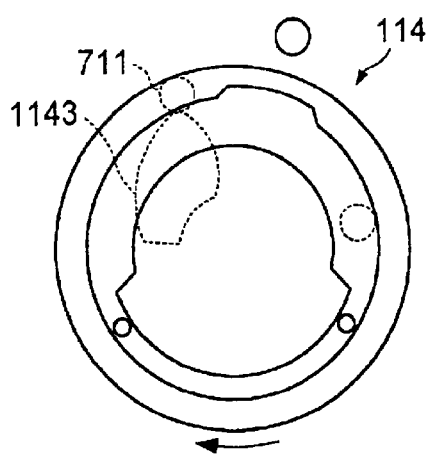
Figure 16B:
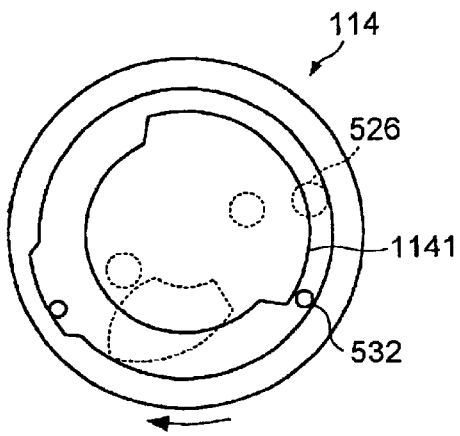

When the cam gear 114 rotates at 20 degrees from the rotation starting position, the state of the cam gear 114 and the member being in contact with the cam gear becomes the state shown in FIG. 16B.

FIG. 16B is a view showing the state of the cam gear and the member being in contact with the cam gear at a time when the set lever rotates.

When the cam gear 114 rotates, whereby the cam follower 532 of the set lever is pressed up by the first cam surface 1141, the set lever 530 shown in FIG. 13 rotates around the rotary shaft 530a against the energizing force applied by the spring which is not shown (a step S8 in FIG. 15), and the front end portion 531 of the set lever 530 is lifted up in the energizing direction of the spring 524 shown in FIG. 7 for energizing the charge lever 520. Then, the charge lever 520 rotates due to the energizing force of the spring 524 (a step S9 in FIG. 15), the front end portion 521 of the charge lever 520 shown in FIG. 8 kicks up the flange 412 of the shutter vane 410 (refer to an arrow P in FIG. 8), and the pin 525 shown in FIG. 14 presses down the synchronous switch 800 for instructing the light emission of the flash 40 so as to make it in the on state (a step S10 in FIG. 15). When the flange 412 of the shutter vane 410 is kicked up by the front end portion 521 of the charge lever 520, the shutter operation (refer to a narrow in FIG. 7) opening and closing the shutter vane 410 is executed (a step S11 in FIG. 15), and the photographing light is exposed on the film unit which is not shown. Further, in the case that the brightness of field is less than the predetermined threshold value, the flash 40 emits light in synchronous with the shutter operation (a step S12 in FIG. 15). In this case, the cam follower 526 of the charge lever 520 moves to an inner side of the cam gear 114 in accordance with the rotation of the charge lever 520.

Figure 16E:
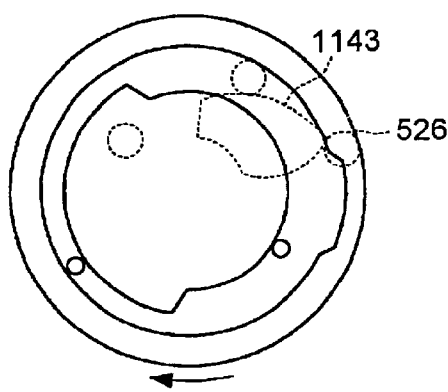
Figure 16C:
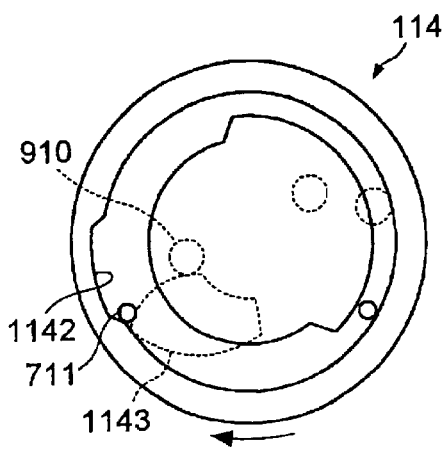

Thereafter, when the cam gear 114 rotates at 35 degrees from the rotation starting position, the state of the cam gear 114 and the member being in contact with the cam gear becomes the state shown in FIG. 16C, and when the cam gear 114 rotates at 150 degrees from the rotation starting position, the state of the cam gear 114 and the member being in contact with the cam gear becomes the state shown in FIG. 16D.

FIG. 16C is the state of the cam gear and the member being in contact with the cam gear at a time when the holding plate starts moving, and FIG. 16D is the state of the cam gear and the member being in contact with the cam gear at a time when the holding plate moves most.

Due to the rotation of the cam gear 114, the first cam follower 910 of the holding plate 900 shown in FIG. 14 is pressed up by the cam member 1143, and the film driving operation is executed (a step S13 in FIG. 15). Firstly, as shown in FIG. 16C, when the first cam follower 910 of the holding plate 900 starts being pressed by the cam member 1143, the hook portion 941 of the claw hook 940 provided in the holding plate 900 shown in FIG. 14 enters between the exposed film unit and the film unit which will be next exposed, among a plurality of film units laminated within the film pack so as to engage the edge of the lower end of the exposed film unit, and a whole of the holding plate 900 starts moving toward the developing roller 111 shown in FIG. 3. Further, during a period that the cam gear 114 further rotates from the rotation starting position to the position at 150 degrees shown in FIG. 16D, the film unit engaged with the hook portion 941 is scraped out from the film pack so as to be moved to the developing roller 111. The film unit reaching the developing roller 111 is gripped by the developing roller 111, is exposed to the developing process and the transferring process, and thereafter is discharged out of the camera. In this case, in the state shown in FIG. 16C, the cam follower 711 of the cam switch lever 710 is pressed up by the second cam surface 1142, and the cam switch lever 710 shown in FIG. 13 rotates around the rotary shaft 710a, whereby the contact portion 712 of the cam switch lever 710 presses up the cam switch 720 so as to switch from the off state to the on state, however, the matter that the cam switch is changed to be in the on state is not detected by the control portion of the camera 1.

When the cam gear 114 continuously rotates from the rotation starting position to the position at 245 degrees, the state of the cam gear 114 and the member being in contact with the cam gear becomes the state shown in FIG. 16E.

FIG. 16E is a view showing the state of the cam gear and the member being in contact with the cam gear, at a time when the charge lever rotates in the direction opposite to the energizing direction applied by the spring.

When the cam gear 114 continuously rotates and the cam member 1143 of the cam gear 114 presses up the cam follower 526 of the charge lever, the charge lever 520 rotates around the rotary shaft 520a shown in FIG. 8 in the direction opposite to the arrow P shown in FIG. 8 against the energizing force of the spring 524 shown in FIG. 7. The shutter charge operation is executed in accordance with the rotation of the charge lever 520, and the charge lever 520 returns to the state (refer to FIG. 16A) at a time when the cam gear 114 starts rotating (a step S14 in FIG. 15). Further, due to the rotation of the charge lever 520, the contact surface 522 of the charge lever 520 moves in the energizing direction applied by the spring which is not shown, for energizing the set lever 530, whereby the set lever 530 also rotates due to the energizing force applied by the spring so as to return to the state (refer to FIG. 16A) at a time when the cam gear 114 starts rotating (the step S14 in FIG. 15).

Thereafter, the cam gear 114 further rotates, whereby the holding plate 900 returns to the position at a time when the cam gear 114 starts rotating, and when the cam gear 114 rotates at 360 degrees (refer to FIG. 16A), the cam follower 711 of the cam switch lever moves along the second cam surface 1142, and the cam switch lever 710 shown in FIG. 13 rotates around the rotary shaft 710a. Due to the rotation of the cam switch lever 710, the contact portion 712 which has pressed up the cam switch 720 rotates in the direction opposite to the direction of pressing up the cam switch 720, whereby the cam switch 720 is changed to be in the off state from the on state. The control portion which is not shown, provided in the camera 1 detects the matter that the cam switch 720 becomes in the off state from the on state so as to stop the rotation of the motor 112 (a step S15 in FIG. 15), so that the cam gear 114 stops rotating (a step S16 in FIG. 15).

As described above with reference to FIGS. 16A to 16E, in the camera 1 in accordance with the present embodiment, it is possible to securely execute a series of main operations within the camera in photographing, and the power source for executing the series of operations can be sufficiently given by only one motor 112 shown in FIG. 7, so that it is possible to realize a low cost.

When the user sinks the lens camera cone 20 to the predetermined sinking position, the operation in a step S17 in FIG. 15 is executed in the camera 1. That is, the protruding piece 233 shown in FIG. 7 moves backward to a rear portion of the main power source switch 115, and the main power source switch 115 is set to be in the off state. Further, the connection between the front end portion 521 of the charge lever 520 and the flange 412 of the shutter vane 410 is cancelled, and the lens barrier 22 is closed. Further, the lens stop plate 610 returns to the lens stop value of the largest opening 611, and the lens stop setting dial 91 rotates so that the index 91a aligns with the position of the light emitting device 92 corresponding to the lens stop value of the largest opening 611 (the step S17 in FIG. 15).

In this case, in accordance with the present embodiment, the description is given of the embodiment in which the present invention is applied to the instant camera feeding the film out of the camera and developing, however, the present invention is not limited to this, and can be applied to the normal camera photographing on the long photographic film one scene by one scene.

As mentioned above, in accordance with the camera of the present invention, it is possible to improve an operability of manually reeling out the lens camera cone or manually sinking the lens camera cone.

What is claimed is:

1. A camera having a main body portion, and a lens camera cone freely sunk and reeled out in accordance with a manual operation, comprising:

a positioning means for positioning said lens camera cone at a predetermined reel-out position at a time when said lens camera cone is reeled out and positioning said lens camera cone at a predetermined sinking position at a time when said lens camera cone is sunk; and an energizing means for energizing said lens camera cone toward said reel-out position at a time when said lens camera cone exists in a portion near said reel-out position, and energizing said lens camera cone toward said sinking position at a time when said lens camera cone exists in a portion near said sinking position.

2. A camera as claimed in claim 1, wherein said energizing means energizes said lens camera cone at each of a plurality of angular positions obtained at a time of separating all the periphery of said lens camera cone into a plurality of sections having a uniform angle.

3. A camera as claimed in claim 2, wherein said energizing means is a toggle spring arranged at said each angular position.

4. A camera as claimed in claim 1, wherein a bellows for shielding light and connecting said main body portion with said lens camera cone is provided, and said bellows carries out a part of said energizing means so as to establish an operation of energizing said lens camera cone toward said reel-out position at a time when said lens camera cone exists in the portion near said reel-out position.

5. A camera as claimed in claim 1, wherein said lens camera cone is provided with a finger-engage portion with which a finger of an operator is engaged at a time of manually reeling out said lens camera cone, in a front end portion thereof.

6. A camera as claimed in claim 1, further comprising:

a lens barrier arranged on a front surface of said lens camera cone, opening in correspondence to a reel-out operation of said lens camera cone and closing in correspondence to a sinking operation of said lens camera cone;

a shutter mechanically connected to said main body portion at a time when said lens camera cone is at said reel-out position, connected to said main body portion via a connecting mechanism in which the connection to said main body portion is removed at a time when said lens camera cone is at said sinking position, executing an opening and closing operation on the basis of a drive force transmitted via said connecting mechanism in correspondence to a release operation at a time when said lens camera cone is at said reel-out position, and getting freedom from the transmission of the drive force applied via said connecting mechanism at a time when said lens camera cone is at said sinking position, said shutter being provided in an inner portion of said lens camera cone; and a main power source switch keeping an on state at a time when said lens camera cone is at said reel-out position and keeping an off state at a time when said lens camera cone is at said sinking position.

7. A camera comprising:

a main body portion;

a lens camera cone freely sunk and reeled out of said main body portion when manually operating the camera;

a positioning element for positioning said lens camera cone at a predetermined reel-out position when said lens camera cone is reeled out and positioning said lens camera cone at a predetermined sinking position when said lens camera cone is sunk; and a plurality of urging elements for urging said lens camera cone toward said reel-out position when said lens camera cone is in said reel-out position, and urging said lens camera cone toward said sinking position when said lens camera cone is in said sinking position.

8. The camera as claimed in claim 7, further comprising first and second projections on a periphery of said lens camera cone.

9. The camera as claimed in claim 8, wherein said first and second projections are 180° to each other.

10. The camera as claimed in claim 8, further comprising two urging elements connected to said first and second projections.

11. The camera as claimed in claim 10, wherein said two urging elements are toggle springs.

12. A camera having a main body portion, and a lens camera cone freely sunk and reeled out in accordance with a manual operation, comprising:

a positioning element for positioning said lens camera cone at a predetermined reel-out position when said lens camera cone is reeled out and positioning said lens camera cone at a predetermined sinking position when said lens camera cone is sunk; and an energizing means for energizing said lens camera cone toward said reel-out position at a time when said lens camera cone exists in a portion near said reel-out position, and energizing said lens camera cone toward said sinking position at a time when said lens camera cone exists in a portion near said sinking position, wherein said lens camera cone is provided with a finger-engage portion with which a finger of an operator is engaged at a time of manually reeling out said lens camera cone, in a front end portion thereof.

13. A camera as claimed in claim 12, wherein said energizing means energizes said lens camera cone at each of a plurality of angular positions obtained at a time of separating all the periphery of said lens camera cone into a plurality of sections having a uniform angle.

14. A camera as claimed in claim 13, wherein said energizing means is a toggle spring arranged at said each angular position.

15. A camera as claimed in claim 12, further comprising a bellows for shielding light and connecting said main body portion with said lens camera cone, said bellows carries out a part of said energizing means so as to establish an operation of energizing said lens camera cone toward said reel-out position at a time when said lens camera cone exists in the portion near said reel-out position.

16. A camera as claimed in claim 12, further comprising:

a lens barrier arranged on a front surface of said lens camera cone, opening in correspondence to a reel-out operation of said lens camera cone and closing in correspondence to a sinking operation of said lens camera cone;

a shutter mechanically connected to said main body portion at a time when said lens camera cone is at said reel-out position, connected to said main body portion via a connecting mechanism in which the connection to said main body portion is removed at a time when said lens camera cone is at said sinking position, executing an opening and closing operation on the basis of a drive force transmitted via said connecting mechanism in correspondence to a release operation at a time when said lens camera cone is at said reel-out position, and getting freedom from the transmission of the drive force applied via said connecting mechanism at a time when said lens camera cone is at said sinking position, said shutter being provided in an inner portion of said lens camera cone; and a main power source switch keeping an on state at a time when said lens camera cone is at said reel-out position and keeping an off state at a time when said lens camera cone is at said sinking position.

17. A camera comprising:

a main body portion;

a lens camera cone freely sunk and reeled out of said main body portion when manually operating the camera; and an urging element for urging said lens camera cone toward a reel-out position when said lens camera cone is in said reel-out position, and urging said lens camera cone toward a sinking position when said lens camera cone is in said sinking position, wherein said lens camera cone has a finger-engage portion in a front end portion thereof with which a finger of an operator is engaged at a time of manually reeling out said lens camera cone.

18. A camera as claimed in claim 17, wherein said urging element urges said lens camera cone at each of a plurality of angular positions obtained at a time of separating all the periphery of said lens camera cone into a plurality of sections having a uniform angle.

19. A camera as claimed in claim 18, wherein said urging element is a toggle spring arranged at said each angular position.

20. A camera as claimed in claim 17, further comprising a bellows for shielding light and connecting said main body portion with said lens camera cone, said bellows carries out a part of said urging so as to establish an operation of urging said lens camera cone toward said reel-out position at a time when said lens camera cone exists in the portion near said reel-out position.

* * * * *